(12) United States Patent
Ha et al.

(10) Patent No.: US 10,747,069 B2
(45) Date of Patent: Aug. 18, 2020

(54) DISPLAY DEVICE

(71) Applicant: Samsung Display Co., Ltd., Yongin-Si, Gyeonggi-Do (KR)

(72) Inventors: Jinjoo Ha, Hwaseong-si (KR); Wonjun Lee, Changwon-si (KR); Younhak Jeong, Cheonan-si (KR); Eunje Jang, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/428,593

(22) Filed: May 31, 2019

(65) Prior Publication Data
US 2020/0026109 A1 Jan. 23, 2020

(30) Foreign Application Priority Data
Jul. 18, 2018 (KR) .................. 10-2018-0083239

(51) Int. Cl.
*G02F 1/1343* (2006.01)
*G02F 1/1362* (2006.01)
*G09G 3/36* (2006.01)
*G02F 1/133* (2006.01)

(52) U.S. Cl.
CPC ........ *G02F 1/1343* (2013.01); *G02F 1/13306* (2013.01); *G02F 1/136286* (2013.01); *G09G 3/3648* (2013.01)

(58) Field of Classification Search
CPC ............... G02F 1/13306; G02F 1/1343; G02F 1/134309; G02F 1/136286; G02F 2001/134345; G09G 3/3648
See application file for complete search history.

(56) References Cited

U.S. PATENT DOCUMENTS

| 8,593,605 | B2 | 11/2013 | Lee et al. | |
|---|---|---|---|---|
| 2012/0075562 | A1* | 3/2012 | Yeh ...................... | G02F 1/1323 349/139 |
| 2014/0354926 | A1 | 12/2014 | Park et al. | |
| 2016/0018705 | A1* | 1/2016 | Cheng ............... | G02F 1/134309 349/123 |
| 2017/0115522 | A1 | 4/2017 | Mun et al. | |
| 2019/0129255 | A1* | 5/2019 | Lee ................... | G02F 1/133707 |
| 2019/0324329 | A1 | 10/2019 | Chong et al. | |

FOREIGN PATENT DOCUMENTS

| KR | 10-2014-0140801 A | 12/2014 |
|---|---|---|
| KR | 10-2017-0048635 A | 5/2017 |
| KR | 10-2018-0033489 A | 4/2018 |
| KR | 10-2019-0122280 A | 10/2019 |

* cited by examiner

*Primary Examiner* — Dmitriy Bolotin
(74) *Attorney, Agent, or Firm* — Innovation Counsel LLP

(57) ABSTRACT

A display device may include a display panel including a first pixel and a second pixel. The first pixel may include a first pixel electrode and a first pixel circuit, and the second pixel may be disposed adjacent to the first pixel and may include a second pixel electrode and a second pixel circuit. The first pixel electrode may include a first electrode including a first side and a second side extending in a first direction, a first connection electrode connected to the first electrode and electrically connected to the first pixel circuit, first branch electrodes extended from the first side in a second direction away from the first connection electrode, and second branch electrodes extended from the second side in a third direction away from the first connection electrode.

20 Claims, 18 Drawing Sheets

DISPLAY DEVICE

CROSS-REFERENCE TO RELATED APPLICATIONS

This U.S. non-provisional patent application claims priority under 35 U.S.C. § 119 to Korean Patent Application No. 10-2018-0083239, filed on Jul. 18, 2018, in the Korean Intellectual Property Office, the entire contents of which are hereby incorporated by reference.

BACKGROUND OF THE INVENTION

The present disclosure relates to a display device having improved transmittance and display quality.

A liquid crystal display device includes a liquid crystal display panel, in which two opposite substrates and a liquid crystal layer between the substrates are provided. If a voltage is applied to an electrode of the liquid crystal display panel, an electric field is produced in the liquid crystal layer. Such an electric field is used to control an orientation of liquid crystal molecules in the liquid crystal layer and a polarization of an incident light, and this process is used to display an image on the liquid crystal display device.

For the liquid crystal display device, in order to realize a wide viewing angle, a fine slit defining a plurality of domains is formed in a pixel electrode. Some of liquid crystal molecules in the domain are not controlled by a fringe field and are not oriented at a predetermined angle to a polarization axis of a polarizing plate. In this case, a gray or black spot may be seen by a user, and this may lead to deterioration in transmittance of the display device.

SUMMARY

An embodiment of the inventive concept provides a display device having improved transmittance and display quality.

According to an embodiment of the inventive concept, a display device may include a display panel including a first pixel and a second pixel. The first pixel may include a first pixel electrode and a first pixel circuit, and the second pixel disposed adjacent to the first pixel may include a second pixel electrode and a second pixel circuit. The first pixel electrode may include a first electrode including a first side and a second side extending in a first direction, a first connection electrode directly connected to the first electrode and electrically connected to the first pixel circuit a width of the first connection electrode being wider than that of the first electrode, first branch electrodes extended from the first side in a second direction away from the first connection electrode, and second branch electrodes extended from the second side in a third direction away from the first connection electrode.

In an embodiment, the second pixel electrode may include a second electrode including a third side and a fourth side extending in the first direction, third branch electrodes extended from the third side in an opposite direction of the third direction, fourth branch electrodes extended from the fourth side in an opposite direction of the second direction, and a second connection electrode connected to at least one of the third branch electrodes or at least one of the fourth branch electrodes and electrically connected to the second pixel circuit.

In an embodiment, a first length in the first direction of the first electrode may be larger than a second length in the first direction of the second electrode.

In an embodiment, the first pixel electrode may further include at least one first connection branch electrode, which is extended from the first connection electrode in the second direction and connected to the first connection electrode, and at least one second connection branch electrode, which is extended from the first connection electrode in the third direction and connected to the first connection electrode.

In an embodiment, the display panel may further include a light-blocking portion. When viewed in a plan view, the light-blocking portion may be overlapped with the first pixel circuit, the second pixel circuit, the second connection electrode, at least a portion of the first electrode, at least a portion of the first connection branch electrode, and at least a portion of the second connection branch electrode.

In an embodiment, the first pixel electrode may further include a first edge electrode, which is extended in the first direction and is connected to the first branch electrodes, and a second edge electrode, which is extended in the first direction and is connected to the second branch electrodes.

In an embodiment, the first edge electrode may be connected to the first connection branch electrode, and the second edge electrode may be connected to the second connection branch electrode.

In an embodiment, the display panel may further include a light-blocking portion. When viewed in a plan view, the light-blocking portion may be overlapped with the first pixel circuit, the second pixel circuit, the first connection electrode, and at least a portion of the first electrode.

In an embodiment, the first electrode may include a first electrode portion overlapped with the light-blocking portion and a second electrode portion non-overlapped with the light-blocking portion. A first width of the first electrode portion may be larger than a second width of the second electrode portion, when measured in a direction perpendicular to the first direction.

In an embodiment, the first pixel electrode may further include a first edge electrode extended in the first direction and connected to the first branch electrodes, a second edge electrode extended in the first direction and connected to the second branch electrodes, and a third edge electrode extended in a direction perpendicular to the first direction and placed in a region adjacent to the first connection electrode.

In an embodiment, a width in the first direction of the third edge electrode may decrease with increasing distance from the first electrode.

In an embodiment, the first pixel electrode may further include first additional branch electrodes, which are extended from the third edge electrode in the second direction, the first additional branch electrodes not directly contacting the first electrode, and second additional branch electrodes, which are extended from the third edge electrode in the third direction, the second additional branch electrodes not directly contacting the first electrode.

In an embodiment, at least some of the first additional branch electrodes may be connected to the first edge electrode, others of the first additional branch electrodes may not be connected to the first edge electrode, at least some of the second additional branch electrodes may be connected to the second edge electrode, and others of the second additional branch electrodes may not be connected to the second edge electrode.

In an embodiment, the first pixel electrode may further include a first edge electrode extended in the first direction and connected to the first branch electrodes, a second edge electrode extended in the first direction and connected to the second branch electrodes, first additional branch electrodes extended from the first edge electrode in a direction parallel to the first branch electrodes, and second additional branch electrodes extended from the second edge electrode in a direction parallel to the second branch electrodes.

According to an embodiment of the inventive concept, a display device may include a first base substrate, a pixel circuit disposed on the first base substrate, a pixel electrode including a connection electrode connected to the pixel circuit, a first electrode directly connected to the connection electrode and extended in a first direction, the first electrode having a width narrower than that of the connection electrode, and a plurality of branch electrodes extended in directions crossing the first direction, the pixel electrode including a first region and a second region based on a position of the first electrode, a liquid crystal layer disposed on the pixel electrode, a second base substrate disposed on the liquid crystal layer, and a light-blocking portion disposed on a surface of the second base substrate facing the first base substrate and overlapped with the pixel circuit and at least a portion of the first electrode, when viewed in a plan view.

In an embodiment, some of the plurality of branch electrodes may be disposed in the first region and may be extended in a second direction, and others of the plurality of branch electrodes may be disposed in the second region and may be extended in a third direction different from the second direction.

In an embodiment, at least some of the plurality of branch electrodes may be connected to the connection electrode and are not connected to the first electrode, and a portion of each of the branch electrodes connected to the connection electrode may be overlapped with the light-blocking portion, when viewed in a plan view.

According to an embodiment of the inventive concept, a display device may include a first pixel including a first pixel electrode and a first pixel circuit, and a second pixel disposed adjacent to the first pixel and including a second pixel electrode and a second pixel circuit. The first pixel electrode may include a first electrode extending in a first direction, a first connection electrode connecting the first electrode to the first pixel circuit, the width of the first connection electrode being wider than that of the first electrode, and a plurality of first branch electrodes extending from sides of the first electrode, which are extended in the first direction, in directions away from the first pixel circuit, the second pixel electrode includes a second electrode extending in the first direction, a plurality of second branch electrodes extending from sides of the second electrode, which are extended in the first direction, in directions toward the second pixel circuit, and a second connection electrode connecting at least some of the plurality of second branch electrodes to the second pixel circuit, and a length in the first direction of the first electrode may be longer than a length in the first direction of the second electrode.

In an embodiment, the first pixel and the second pixel may be provided in plural, the first pixels and the second pixels may be alternately arranged one by one in the first direction, and the first pixels and the second pixels may be alternately arranged, at least, one by one in a direction perpendicular to the first direction.

In an embodiment, the first connection electrode may be connected to at least some of the plurality of first branch electrodes.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
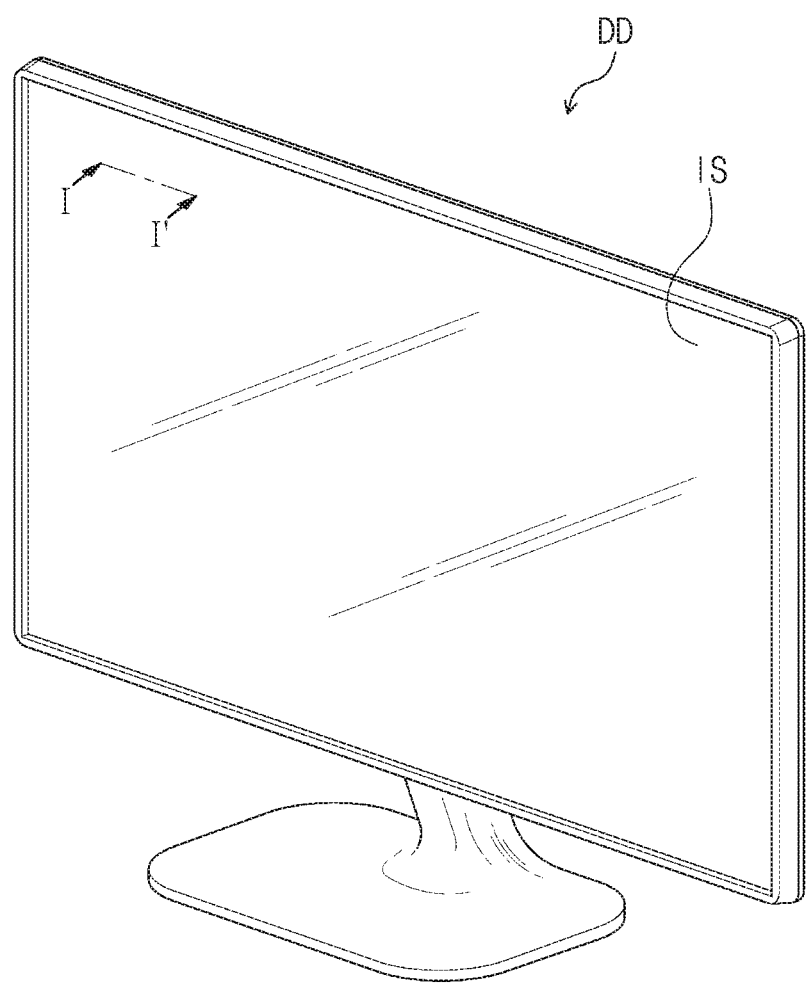
FIG. 1 is a perspective view illustrating a display device according to an embodiment of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concept will now be described more fully with reference to the accompanying drawings, in which example embodiments are shown. Example embodiments of the inventive concept may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concept are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concept should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concept belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a perspective view illustrating a display device DD according to an embodiment of the inventive concept.

Referring to FIG. 1, the display device DD may be configured to display an image through a display surface IS. In FIG. 1, the display surface IS is illustrated to include a surface defined by a first direction DR1 and a second direction DR2 crossing the first direction DR1. However, this is just an example of the display surface IS, and in an embodiment, although not shown, the display device may be provided to have a curved display surface.

A thickness direction of the display device DD will be referred to as a third direction DR3. However, directions indicated by the first to third directions DR1, DR2, and DR3 may be relative concept, and in an embodiment, they may be changed to indicate other directions.

The display device DD may be used for large-sized electronic devices (e.g., television sets, monitors, and outdoor billboards) or small- or medium-sized electronic devices (e.g., personal computers, notebook computers, personal digital assistants, car navigation systems, game machines, portable electronic devices, and cameras). However, it should be understood that these are merely examples of the inventive concept, and that other electronic devices may be used to realize the inventive concept, unless they do not depart from the inventive concept.

Figure 2:
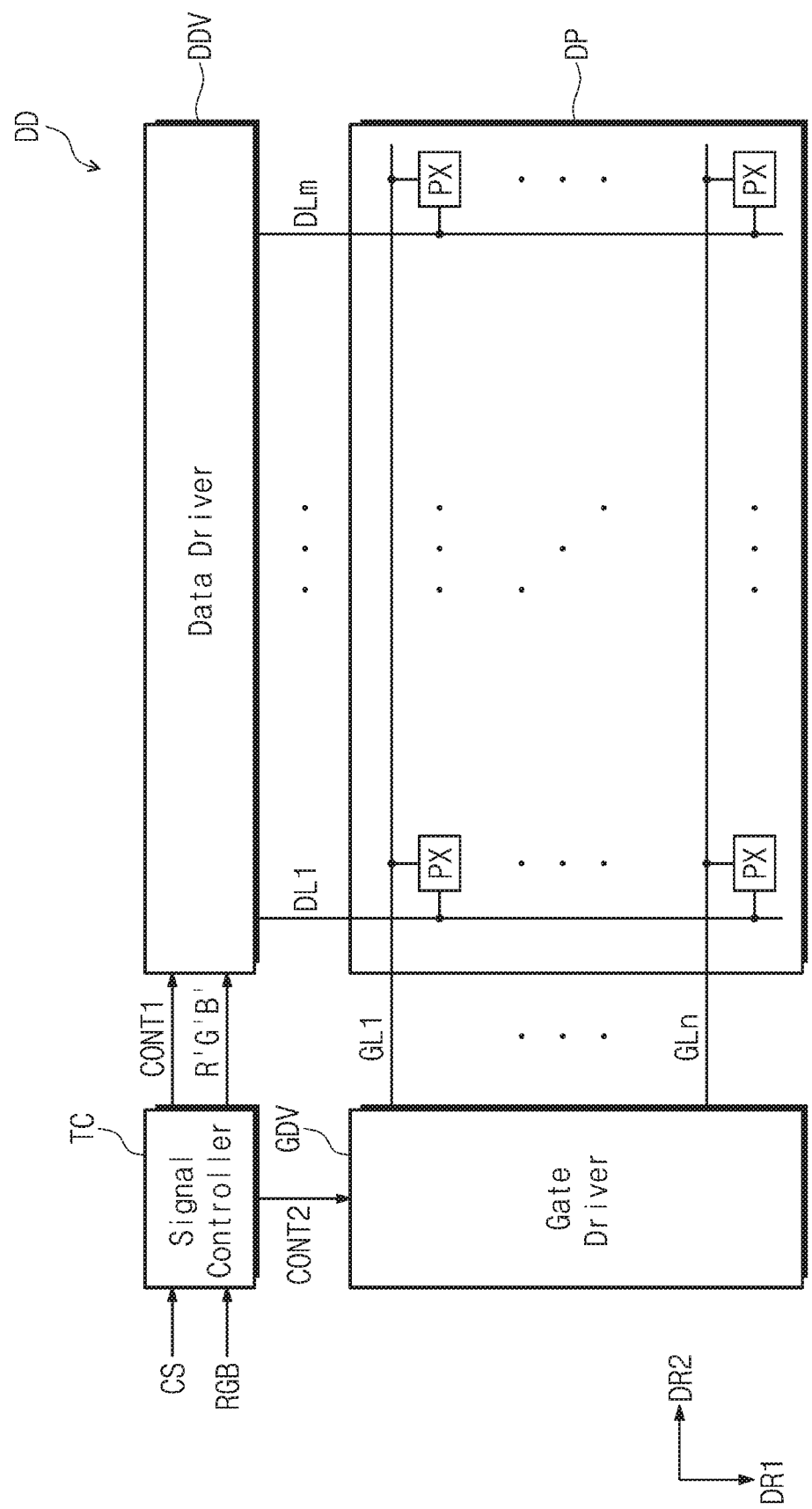
FIG. 2 is a block diagram illustrating a display device according to an embodiment of the inventive concept.

FIG. 2 is a block diagram illustrating the display device DD according to an embodiment of the inventive concept.

Referring to FIG. 2, the display device DD may include a display panel DP, a signal controller or timing controller TC, a data driver DDV, and a gate driver GDV. Each of the signal controller TC, the data driver DDV, and the gate driver GDV may be implemented in the form of a circuit.

The display panel DP may be a liquid crystal display panel. The display device DD may further include a backlight unit (not shown), which is used to provide light to the display panel DP. The display panel DP may be configured to control a transmission ratio of light generated by the backlight unit and thereby to display an image.

The display panel DP may include a plurality of data lines DL1-DLm, a plurality of gate lines GL1-GLn, and a plurality of pixels PX.

The data lines DL1-DLm may be extended in the first direction DR1 and may be arranged in the second direction DR2 crossing the first direction DR1. The gate lines GL1-GLn may be extended in the second direction DR2 and may be arranged in the first direction DR1.

The pixels PX may be arranged in the first direction DR1 and the second direction DR2. Each of the pixels PX may be configured to display one of primary colors or one of mixed colors. The primary colors may include red, green, and blue, and the mixed colors may include various colors, such as white, yellow, cyan, and magenta. However, colors, which can be displayed by the pixels PX, are not limited to the above colors.

Each of the pixels PX may include a pixel electrode and a pixel circuit, which is electrically connected to the pixel electrode. The pixel circuit may include a plurality of transistors. Each of the pixels PX may be electrically connected to a corresponding one of the gate lines GL1-GLn and a corresponding one of the data lines DL1-DLm.

FIG. 2 exemplarily illustrates a 1G1D structure, in which one gate line and one data line are connected to each of the pixels PX, but the inventive concept is not limited thereto. In an embodiment, the number of the gate lines may be reduced to half the number of the gate lines GL1-GLn shown in FIG. 2. This may be a half gate double data (HG2D) structure. For example, one gate line may be provided for two adjacent rows of pixels. Each gate line may provide the same gate signal to two pixels that are located adjacent to each other in the first direction DR1. Thus, a gate signal providing time may be increased twice, compared with the 1G1D structure. As a result, it may be possible to realize a sufficiently long charging time of the data voltage.

The signal controller TC may receive image data RGB provided from the outside. The signal controller TC may be configured to convert the image data RGB to image data R'G'B', which are suitable for operations of the display panel DP, and to output the converted image data R'G'B' to the data driver DDV.

The signal controller TC may receive a control signal CS provided from the outside. The control signal CS may include a vertical synchronization signal, a horizontal synchronization signal, a main clock signal, and a data enable signal, or the like. The signal controller TC may provide a first control signal CONT1 to the data driver DDV and may provide a second control signal CONT2 to the gate driver GDV. The first control signal CONT1 may be used to control the data driver DDV, and the second control signal CONT2 may be used to control the gate driver GDV.

The data driver DDV may drive the data lines DL1-DLm, in response to the first control signal CONT1 from the signal controller TC. The data driver DDV may be implemented as a separate integrated circuit and may be electrically connected to a side region of the display panel DP. In an embodiment, the data driver DDV may be directly mounted on the display panel DP. The data driver DDV may be provided in the form of a single chip or a plurality of chips.

The gate driver GDV may drive the gate lines GL1-GLn, in response to the second control signal CONT2 from the signal controller TC. The gate driver GDV may be integrated on a predetermined region of the display panel DP. In this case, the gate driver GDV may include a plurality of thin film transistors, which are formed by a low temperature polycrystalline silicon (LTPS) process or a low temperature polycrystalline oxide (LTPO) process. Furthermore, the gate driver GDV may be provided in the form of a separate integrated circuit (IC) chip and may be electrically connected to a side region of the display panel DP.

While one of the gate lines GL1-GLn is applied with a gate-on voltage, a switching transistor of each pixel in a row of pixels connected thereto may be turned on. Here, the data driver DDV may provide data driving signals to the data lines DL1-DLm. The data driving signals provided to the data lines DL1-DLm may be respectively applied to corresponding pixels through the turned-on switching transistors.

Figure 3:
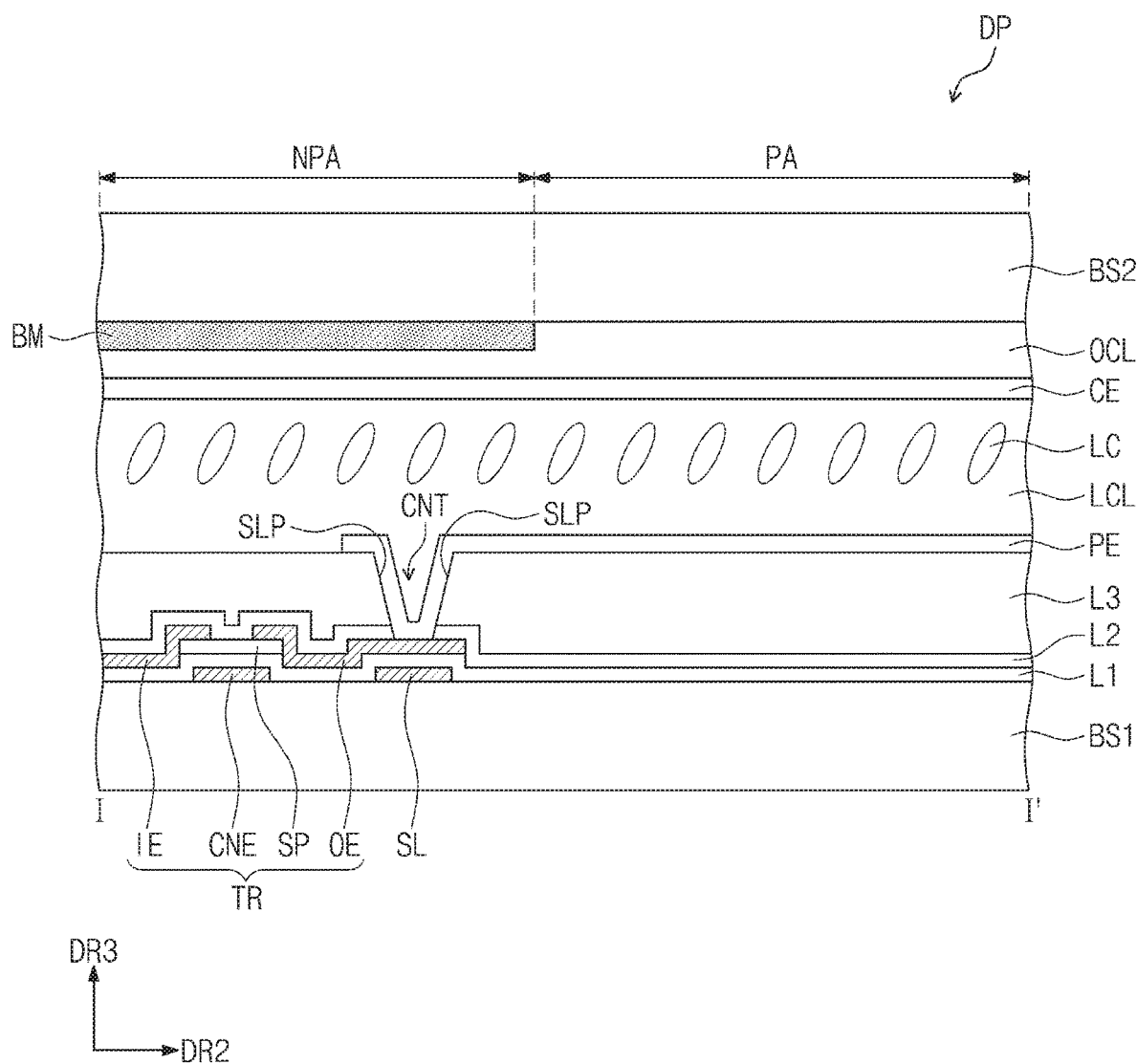
FIG. 3 is a sectional view illustrating a display panel according to an embodiment of the inventive concept.

FIG. 3 is a sectional view illustrating the display panel DP according to an embodiment of the inventive concept.

Referring to FIG. 3, the display panel DP may include a first base substrate BS1, a second base substrate BS2, a pixel circuit PXC (e.g., see FIG. 4), a pixel electrode PE, a common electrode CE, a liquid crystal layer LCL, and a light-blocking portion BM.

The first base substrate BS1 and the second base substrate BS2 may be optically transparent. Thus, light generated by a backlight unit (not shown) may pass through the first base substrate BS1 to be incident into the liquid crystal layer LCL, and light passing through the liquid crystal layer LCL may pass through the second base substrate BS2. The first base substrate BS1 and the second base substrate BS2 may be formed of or include an insulating material. For example, at least one of the first base substrate BS1 and the second base substrate BS2 may be a silicon substrate, a plastic substrate, an insulating film, a stacking structure, or a glass substrate. The stacking structure may include a plurality of insulating layers.

Each of the pixels PX (e.g., see FIG. 1) may include the pixel circuit PXC (e.g., see FIG. 4), the pixel electrode PE, the liquid crystal layer LCL, and the common electrode CE.

The pixel circuit PXC may include at least one transistor and at least one capacitor. For convenience in illustration, only one transistor TR is illustrated in FIG. 3.

The transistor TR may include a control electrode CNE, an input electrode IE, an output electrode OE, and a semiconductor pattern SP.

The control electrode CNE may be disposed on the first base substrate BS1. The control electrode CNE may be formed of or include a conductive material. The conductive material may be, for example, a metallic material, and in an embodiment, the metal material may include, for example, molybdenum, silver, titanium, copper, aluminum, or alloys thereof.

A storage line SL may be disposed on the first base substrate BS1. The storage line SL may be simultaneously formed by the same process as that for the control electrode CNE. A storage voltage may be provided to the storage line SL. A storage capacitor (not shown) may be charged to a voltage level corresponding to a difference between a pixel voltage, which is provided to the pixel electrode PE, and the storage voltage.

A first insulating layer L1 may be disposed on the first base substrate BS1 to cover the control electrode CNE and the storage line SL. In other words, the control electrode CNE and the storage line SL may be disposed between the first insulating layer L1 and the first base substrate BS1.

The semiconductor pattern SP may be disposed on the first insulating layer L1 to overlap the control electrode CNE in a plan view. When viewed in a sectional view, the semiconductor pattern SP may be spaced apart from the control electrode CNE with the first insulating layer L1 interposed therebetween.

The semiconductor pattern SP may include a semiconductor material. For example, the semiconductor material may include at least one of amorphous silicon, poly silicon, single crystalline silicon, oxide semiconductor, or compound semiconductor. The pixel circuit PXC may include a plurality of transistors, which includes the same semiconductor material. In an embodiment, some of the transistors may include a semiconductor material that is different from that of the others.

The input electrode IE and the output electrode OE may be disposed on the semiconductor pattern SP to overlap the semiconductor pattern SP in a plan view.

A second insulating layer L2 may be disposed on the first insulating layer L1 to cover the semiconductor pattern SP, the input electrode IE, and the output electrode OE. In other words, the semiconductor pattern SP, the input electrode IE, and output electrodes OE may be disposed between the first insulating layer L1 and the second insulating layer L2.

A third insulating layer L3 may be disposed on the second insulating layer L2. The third insulating layer L3 may be a color filter. For example, in the case where the third insulating layer L3 is a red color filter, the third insulating layer L3 may be configured to allow red light to pass therethrough and to prevent non-red light from passing therethrough. FIG. 3 illustrates an example in which the third insulating layer L3 is used as the color filter, but the inventive concept is not limited to this example. For example, in an embodiment, the third insulating layer L3 may be a transparent insulating layer having a flat top surface, and the color filter may be formed on the second base substrate BS2. Furthermore, in an embodiment, the color filter may be replaced with a wavelength conversion layer. The wavelength conversion layer may include a quantum dot, a quantum rod, or the like.

Furthermore, although not shown in FIG. 3, a capping layer may be further provided to cover the third insulating layer L3. The capping layer may be formed of or include an inorganic material (e.g., silicon nitride or silicon oxide). Since the capping layer covers the third insulating layer L3, the capping layer may be used to protect the third insulating layer L3. In addition, the capping layer may be provided to have an opening (not shown), thorough which a gas generated in the third insulating layer L3 can be exhausted.

The pixel electrode PE may be electrically connected to the transistor TR. A contact hole CNT may be defined in the third insulating layer L3. The contact hole CNT may be formed by removing a portion of the third insulating layer L3. The contact hole CNT may expose an element provided under the third insulating layer L3. For example, the contact hole CNT may be provided to expose the output electrode OE. The pixel electrode PE may be electrically connected to the output electrode OE exposed by the contact hole CNT. The pixel electrode PE may be in direct contact with the output electrode OE, thereby being electrically connected to the output electrode OE, or may be indirectly connected to the output electrode OE through a conductive member disposed between the pixel electrode PE and the output electrode OE.

The liquid crystal layer LCL may be disposed on the pixel electrode PE. The liquid crystal layer LCL may include a plurality of liquid crystal molecules LC. The orientation of the liquid crystal molecules LC may be changed by an electric field produced between the common electrode CE and the pixel electrode PE.

The second base substrate BS2 may be disposed on the liquid crystal layer LCL. The light-blocking portion BM may be disposed on a surface of the second base substrate BS2 facing the first base substrate BS1. When viewed in a plan view, the light-blocking portion BM may be overlapped with the pixel circuit PXC (e.g., see FIG. 4). In the present specification, the expression "when viewed in a plan view" may be used to represent that the display panel DP is observed in the third direction DR3 (i.e., the thickness direction thereof).

A region, which is covered by the light-blocking portion BM, may be defined as a non-light-emitting region NPA, and a region, which is not covered by the light-blocking portion BM, may be defined as a light-emitting region PA. Light passing through the liquid crystal layer LCL may be emitted to the outside of the second base substrate BS2 through the light-emitting region PA.

A planarization layer OCL may be disposed on the surface of the second base substrate BS2 facing the first base substrate BS1 to cover the light-blocking portion BM. The planarization layer OCL may be formed of or include an organic material. The common electrode CE may be disposed on the planarization layer OCL.

Figure 4:
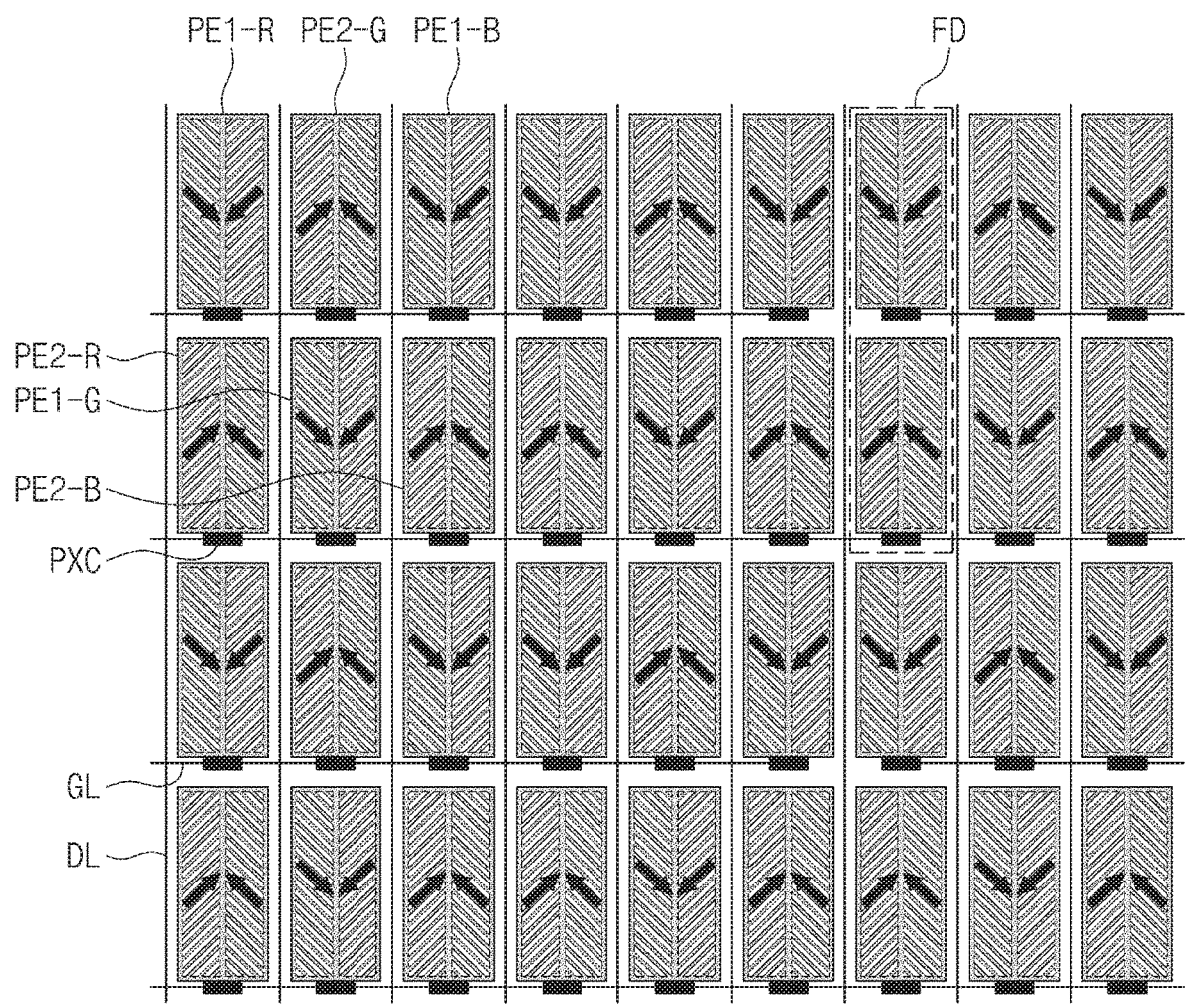
FIG. 4 is a plan view illustrating pixels according to an embodiment of the inventive concept.

FIG. 4 is a plan view illustrating pixels according to an embodiment of the inventive concept. For convenience in illustration, FIG. 4 illustrates only data lines DL, gate lines GL, a first pixel electrodes PE1 (PE1-R, PE1-G and PE1-B), a second pixel electrodes PE2 (PE2-R, PE2-G and PE2-B), and the pixel circuit PXC. In addition, the pixel circuit PXC is illustrated as a black rectangular box, but it may be readily understood that the pixel circuit PXC includes at least one transistor.

Each of the pixel electrodes PE1-R, PE1-G, PE1-B, PE2-R, PE2-G, and PE2-B may include two domains. For example, each of the pixel electrodes PE1-R, PE1-G, PE1-B, PE2-R, PE2-G, and PE2-B may include two domains disposed opposite sides of a stem electrode, which passes through a center thereof and extends in the first direction DR1. In the case where a plurality of domains are provided, liquid crystal molecules may be leaned in several directions, and this may make it possible to improve an oblique viewing property.

In FIG. 4, the leaning direction of the liquid crystal molecules in each domain is depicted by an arrow.

In the present specification, a fourth direction DRa may be a direction crossing the first direction DR1 and the second direction DR2, a fifth direction DRb may be a direction crossing the first direction DR1, the second direction DR2, and the fourth direction DRa, a sixth direction DRc may be a direction opposite to the fourth direction DRa, and a seventh direction DRd may be a direction opposite to the fifth direction DRb. The fourth direction DRa and the sixth direction DRc may be directions directly opposite to each other, but the inventive concept is not limited thereto. Furthermore, the fifth direction DRb and the seventh direction DRd may be directions directly opposite to each other, but the inventive concept is not limited thereto.

In each of the first pixel electrodes PE1-R, PE1-G, and PE1-B of the pixel electrodes PE1-R, PE1-G, PE1-B, PE2-R, PE2-G, and PE2-B, liquid crystal molecules, which are placed at a left side of the stem electrode, may be inclined in the sixth direction DRc, whereas liquid crystal molecules, which are placed at a right side of the electrode, may be inclined in the seventh direction DRd.

In each of the second pixel electrodes PE2-R, PE2-G, and PE2-B of the pixel electrodes PE1-R, PE1-G, PE1-B, PE2-R, PE2-G, and PE2-B, liquid crystal molecules, which are placed at a left side of the stem electrode, may be inclined in the fifth direction DRb, whereas liquid crystal molecules, which are placed at a right side of the stem electrode, may be inclined in the fourth direction DRa.

A leaning direction of liquid crystal molecules disposed on the first pixel electrodes PE1-R, PE1-G, and PE1-B may be different from a leaning direction of liquid crystal molecules disposed on the second pixel electrodes PE2-R, PE2-G, and PE2-B. Although each pixel include two domains, the combination of the first pixel electrode and the second pixel electrode may lead to the same effect as the case having four domains.

Pixels including the first pixel electrodes PE1-R, PE1-G, and PE1-B will be referred to as "first pixels", whereas pixels including the second pixel electrodes PE2-R, PE2-G, and PE2-B will be referred to as "second pixels".

When viewed in a plan view, the first pixel electrodes PE1-R, PE1-G, and PE1-B may include a first pixel electrode PE1-R overlapped with a red color filter, a first pixel electrode PE1-G overlapped with a green color filter, and a first pixel electrode PE1-B overlapped with a blue color filter.

When viewed in a plan view, the second pixel electrodes PE2-R, PE2-G, and PE2-B may include a second pixel electrode PE2-R overlapped with the red color filter, a second pixel electrode PE2-G overlapped with the green color filter, and a second pixel electrode PE2-B overlapped with the blue color filter.

The first pixel electrode PE1-R and the second pixel electrode PE2-R may be alternately arranged one by one in the first direction DR1. The first pixel electrode PE1-G and the second pixel electrode PE2-G may be alternately arranged one by one in the first direction DR1. The first pixel electrode PE1-B and the second pixel electrode PE2-B may be alternately arranged one by one in the first direction DR1.

FIG. 4 illustrates a region FD, which has four domain regions, in which the first pixel electrode PE1-R and the second pixel electrode PE2-R are provided. In an embodiment, since each of the pixel electrodes PE1-R, PE1-G, PE1-B, PE2-R, PE2-G, and PE2-B includes two domain regions, an opening ratio may be improved, compared to pixel electrodes, each of which includes four domain regions. Furthermore, since the first pixel electrodes PE1-R, PE1-G, and PE1-B and the second pixel electrodes PE2-R, PE2-G, and PE2-B have domains different from each other, it may be possible to realize the same effect as the case having four domains. Accordingly, it may be possible to improve an oblique viewing property.

The first pixel electrodes PE1-R, PE1-G, and PE1-B and the second pixel electrodes PE2-R, PE2-G, and PE2-B may be alternately arranged, at least, one by one in the second direction DR2. In an embodiment, the first pixel electrode PE1-R, the second pixel electrode PE2-G, and the first pixel electrode PE1-B may be sequentially arranged in the second direction DR2. For example, the first pixel electrode PE1-R, the second pixel electrode PE2-G, and the first pixel electrode PE1-B may be repeatedly arranged in the order enumerated. That is, the first pixel electrode PE1-B and the first pixel electrode PE1-R may be seriately arranged. In an embodiment, the first pixel electrode and the second pixel electrode may be alternately arranged one by one in the second direction DR2. In this case, the first pixel electrode PE1-R, the second pixel electrode PE2-G, the first pixel electrode PE1-B, the second pixel electrode PE2-R, the first pixel electrode PE1-G, and the second pixel electrode PE2-B may be repeatedly arranged in the order enumerated.

Figure 5:
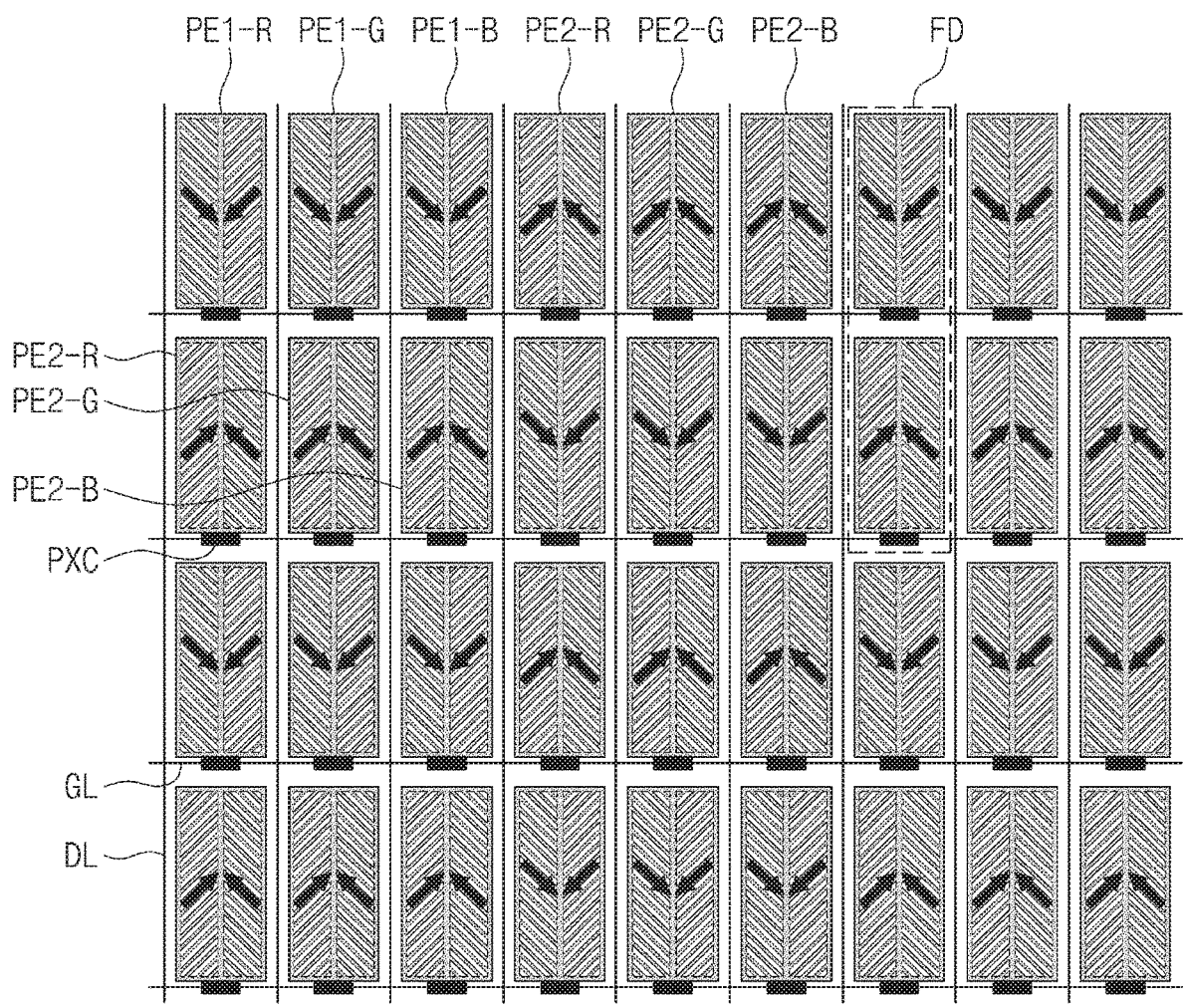
FIG. 5 is a plan view illustrating pixels according to an embodiment of the inventive concept.

FIG. 5 is a plan view illustrating pixels according to an embodiment of the inventive concept. In the following description of FIG. 5, an element previously described with reference to FIG. 4 will be identified by the same reference number without repeating an overlapping description thereof.

Referring to FIG. 5, the first pixel electrode PE1-R and the second pixel electrode PE2-R may be alternately arranged one by one in the first direction DR1. The first pixel electrode PE1-G and the second pixel electrode PE2-G may be alternately arranged one by one in the first direction DR1. The first pixel electrode PE1-B and the second pixel electrode PE2-B may be alternately arranged one by one in the first direction DR1.

The first pixel electrodes PE1-R, PE1-G, and PE1-B and the second pixel electrodes PE2-R, PE2-G, and PE2-B may be alternately arranged, at least, one by one in the second direction DR2. In an embodiment, the first pixel electrode PE1-R, the first pixel electrode PE1-G, the first pixel electrode PE1-B, the second pixel electrode PE2-R, the second pixel electrode PE2-G, and the second pixel electrode PE2-B may be sequentially arranged in the second direction DR2.

Figure 6:
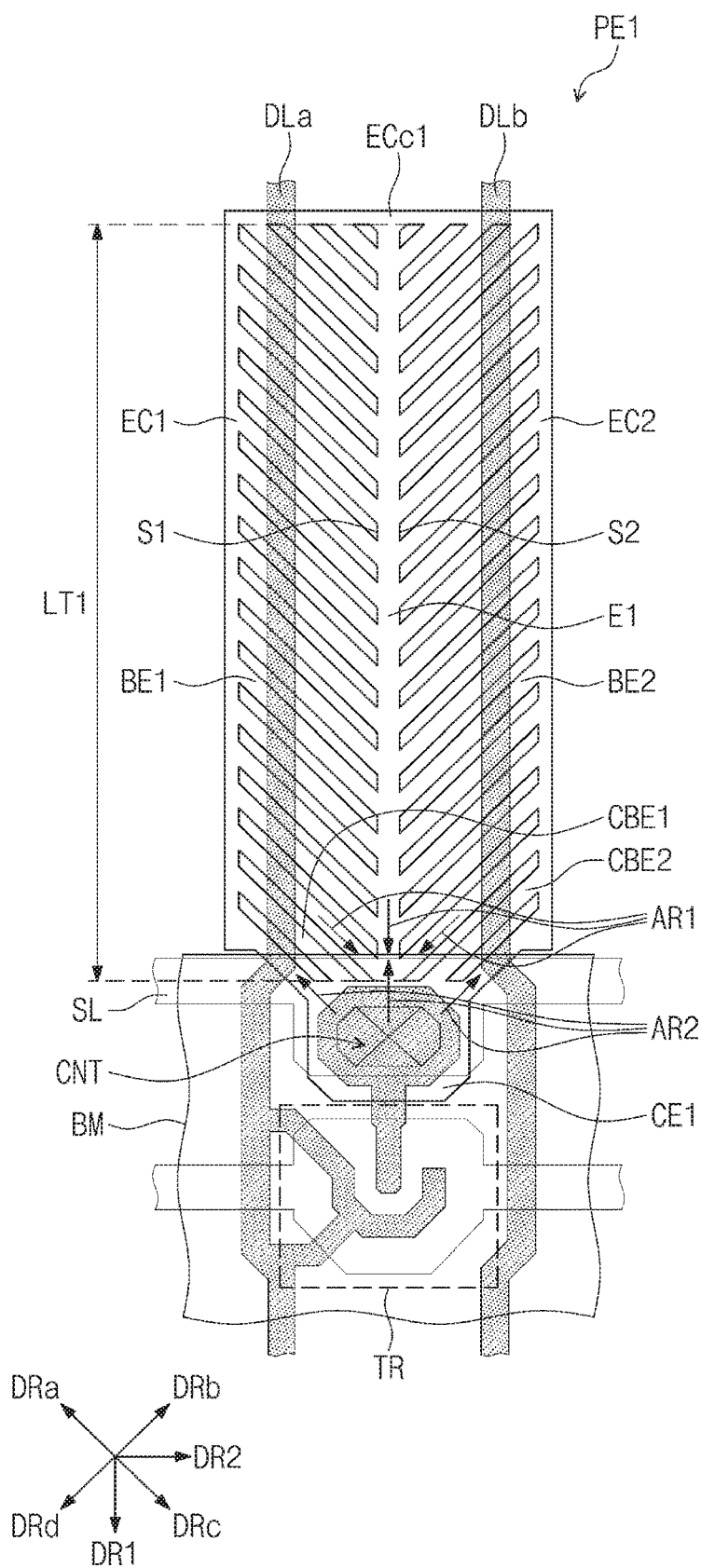
FIG. 6 is a plan view illustrating a first pixel electrode according to an embodiment of the inventive concept.

FIG. 6 is a plan view illustrating a first pixel electrode PE1 according to an embodiment of the inventive concept.

Each of the first pixel electrodes PE1-R, PE1-G, and PE1-B described with reference to FIGS. 4 and 5 may have substantially the same shape as a first pixel electrode PE1 shown in FIG. 6.

Referring to FIG. 6, a first pixel electrode PE1 may include a first electrode E1, a first connection electrode CE1, first branch electrodes BE1, second branch electrodes BE2, a first connection branch electrode CBE1, a second connection branch electrode CBE2, a first edge electrode EC1, and a second edge electrode EC2. The first electrode E1, the first connection electrode CE1, the first branch electrodes BE1, the second branch electrodes BE2, the first connection branch electrode CBE1, the second connection branch electrode CBE2, the first edge electrode EC1, and the second edge electrode EC2 may be connected to constitute a single object.

Each of the first electrode E1, the first edge electrode EC1, and the second edge electrode EC2 may be extended in the first direction DR1.

The first electrode E1 may be placed to pass through a center of the first pixel electrode PE1, the first edge electrode EC1 may be placed at a left side of the first electrode E1, and the second edge electrode EC2 may be placed at a right side of the first electrode E1. In other words, the first electrode E1 may be disposed between the first edge electrode EC1 and the second edge electrode EC2.

The first electrode E1 may be directly connected to the first connection electrode CE1. The first connection electrode CE1 may be an electrode that is disposed to cover the contact hole CNT and is electrically connected to the transistor TR through the contact hole, and may have a width wider than the first electrode along the second direction.

The first electrode E1 may include a first side S1 and a second side S2, which are extended in the first direction DR1. The first connection electrode CE1 may be disposed on an extension line of the first side S1 and the second side S2. Therefore, when viewed in the first direction DR1, the first electrode E1 may overlap with the first connection electrode CE1. Also, the first connection electrode CE1 may be directly connected to the first side S1 and the second side S2.

The first branch electrodes BE1 may be extended from the first side S1 in a direction (e.g., the fourth direction DRa) away from the first connection electrode CE1. The second branch electrodes BE2 may be extended from the second side S2 in a direction (e.g., the fifth direction DRb) away from the first connection electrode CE1. The first branch electrodes BE1 may be spaced apart from each other, and a slit may be defined between each adjacent pair of the first branch electrodes BE1. The second branch electrodes BE2 may be spaced apart from each other, and a slit may be defined between each adjacent pair of the second branch electrodes BE2.

One ends of the first branch electrodes BE1 may be connected to the first electrode E1, and opposite ends of the first branch electrodes BE1 may be connected to the first edge electrode EC1. One ends of the second branch electrodes BE2 may be connected to the first electrode E1, and opposite ends of the second branch electrodes BE2 may be connected to the second edge electrode EC2. In an embodiment, the first edge electrode EC1 and the second edge electrode EC2 may be omitted.

Each of the first connection branch electrode CBE1 and the second connection branch electrode CBE2 may be extended from the first connection electrode CE1. Each of the first connection branch electrode CBE1 and the second connection branch electrode CBE2 may be provided in plural.

The first connection branch electrode CBE1 may be extended from the first connection electrode CE1 in the fourth direction DRa, and the second connection branch electrode CBE2 may be extended from the first connection electrode CE1 in the fifth direction DRb. In other words, the first connection branch electrode CBE1 may be extended in a direction parallel to the first branch electrodes BE1, and the second connection branch electrode CBE2 may be extended in a direction parallel to the second branch electrodes BE2.

One end of the first connection branch electrode CBE1 may be connected to the first connection electrode CE1, and an opposite end of the first connection branch electrode CBE1 may be connected to the first edge electrode EC1. One end of the second connection branch electrode CBE2 may be connected to the first connection electrode CE1, and an opposite end of the second connection branch electrode CBE2 may be connected to the second edge electrode EC2. The first connection branch electrode CBE1 and the second connection branch electrode CBE2 may not be connected to the first electrode E1.

In an embodiment, the first connection electrode CE1 may be connected to the first electrode E1, the first connection branch electrode CBE1, and the second connection branch electrode CBE2. A pixel voltage, which is provided from a first data line DLa and is received through the transistor TR, may be transferred to the entirety of the first pixel electrode PE1 through the first connection electrode CE1, the first electrode E1, the first connection branch electrode CBE1, and the second connection branch electrode CBE2. A second data line DLb may be used to provide a pixel voltage to a pixel electrode, which is spaced apart from the first pixel electrode PE1 in the first direction DR1.

When viewed in a plan view, the light-blocking portion BM may be overlapped with the first connection electrode CE1, at least a portion of the first electrode E1, at least a portion of the first connection branch electrode CBE1, and at least a portion of the second connection branch electrode CBE2. Thus, orientations of liquid crystal molecules, which are placed in a region overlapped with the light-blocking portion BM, may be controlled by at least a portion of the first electrode E1, at least a portion of the first connection branch electrode CBE1, and at least a portion of the second connection branch electrode CBE2.

Referring to FIG. 3, the contact hole CNT may be formed to have a slant surface SLP in the third insulating layer L3. The orientation of liquid crystal molecules near the slant surface SLP may be distorted by the slant surface. In FIG. 6, a first arrow AR1 may represent an inclination direction of liquid crystal molecules controlled by the first electrode E1, the first connection branch electrode CBE1, and the second connection branch electrode CBE2, and a second arrow AR2 may represent an inclination direction of the distorted liquid crystal molecules located on or near the slant surface SLP.

In an embodiment, the first electrode E1, the first connection branch electrode CBE1, and the second connection branch electrode CBE2 may control the orientation of the liquid crystal molecule disposed in a region overlapped with the light-blocking portion BM. Thus, even though the liquid crystal molecules near the slant surface SLP are distorted to exert a resistive force on each other, the distortion of the liquid crystal molecules may occur in the region overlapped with the light-blocking portion BM. The distortion of the liquid crystal molecules may result in a texture in the region overlapped with the light-blocking portion BM. The texture may cause a reduction in transmittance, moreover, since a user recognizes the texture as a stain, the texture may lead to deterioration in display quality. According to an embodiment of the inventive concept, the texture may be veiled by the light-blocking portion BM. Thus, the texture may not be recognized by a user.

Figure 7:
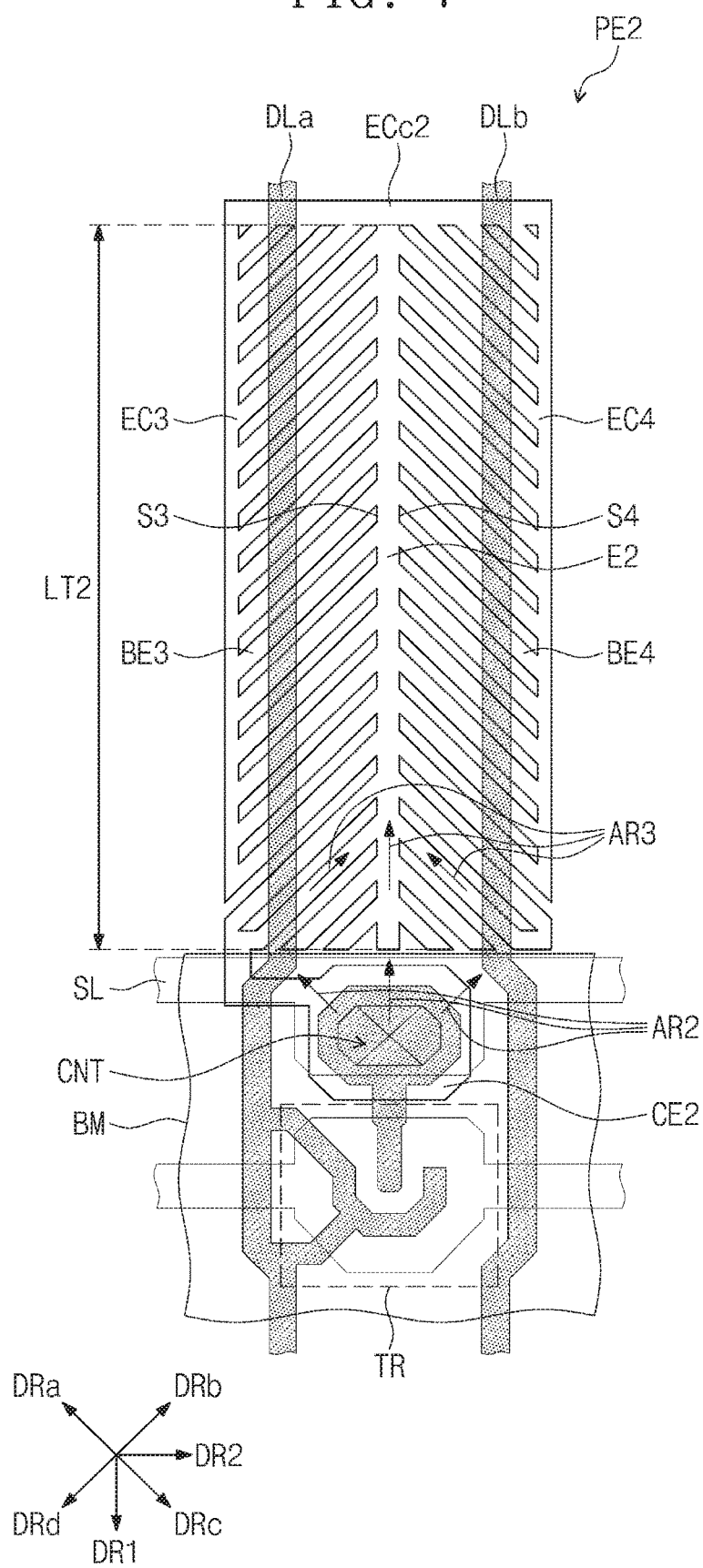
FIG. 7 is a plan view illustrating a second pixel electrode according to an embodiment of the inventive concept.

FIG. 7 is a plan view illustrating a second pixel electrode PE2 according to an embodiment of the inventive concept.

Each of the second pixel electrodes PE2-R, PE2-G, and PE2-B described with reference to FIGS. 4 and 5 may have substantially the same shape as a second pixel electrode PE2 shown in FIG. 7.

Referring to FIG. 7, a second pixel electrode PE2 may include a second electrode E2, a second connection electrode CE2, third branch electrodes BE3, fourth branch electrodes BE4, a third edge electrode EC3, and a fourth edge electrode EC4. The second electrode E2, the second connection electrode CE2, the third branch electrodes BE3, the fourth branch electrodes BE4, the third edge electrode EC3, and the fourth edge electrode EC4 may be connected to constitute a single object.

Each of the second electrode E2, the third edge electrode EC3, and the fourth edge electrode EC4 may be extended in the first direction DR1.

The second electrode E2 may be placed to pass through a center of the second pixel electrode PE2, the third edge electrode EC3 may be placed at a left side of the second electrode E2, and the fourth edge electrode EC4 may be placed at a right side of the second electrode E2. In other words, the second electrode E2 may be placed between the third edge electrode EC3 and the fourth edge electrode EC4.

The second electrode E2 may include a third side S3 and a fourth side S4 extending in the first direction DR1. The third branch electrodes BE3 may be extended from the third side S3 in an opposite direction of the fifth direction DRb. The opposite direction of the fifth direction DRb may be the seventh direction DRd. The fourth branch electrodes BE4 may be extended from the fourth side S4 in an opposite direction of the fourth direction DRa. The opposite direction of the fourth direction DRa may be the sixth direction DRc.

The second connection electrode CE2 may be an electrode that is disposed in the contact hole CNT and is electrically connected to the transistor TR. The second connection electrode CE2 may be connected to at least one of the third branch electrodes BE3 or at least one of the fourth branch electrodes BE4. FIG. 7 illustrates an example in which the second connection electrode CE2 is connected to two electrodes of the third branch electrodes BE3.

In FIG. 7, a second arrow AR2 may represent an inclination direction of distorted liquid crystal molecules placed on or near the slant surface SLP (e.g., see FIG. 3), and a third arrow AR3 may represent an inclination direction of liquid crystal molecules controlled by the third branch electrodes BE3 and the fourth branch electrodes BE4. In FIG. 7, all of the liquid crystal molecules may be inclined in a direction away from the transistor TR. Thus, the possibility of occurrence of the texture in the second pixel electrode PE2 may be smaller than that in the first pixel electrode PE1 (e.g., see FIG. 6).

Referring to FIGS. 6 and 7, a first length LT1 in the first direction DR1 of the first electrode E1 may be different from a second length LT2 in the first direction DR1 of the second electrode E2. A length of the first electrode E1 of the first pixel electrode PE1 may be longer than a length of the second electrode E2 of the second pixel electrode PE2, and this may make it possible to control a position of the texture caused by the distorted liquid crystal molecules near the contact hole CNT. Thus, the first length LT1 may be longer than the second length LT2.

The first length LT1 may correspond to a distance between a boundary between the first electrode E1 and the first connection electrode CE1 and a boundary between the first electrode E1 and an edge electrode ECc1. The edge electrode ECc1 may be an electrode that connects the first edge electrode EC1 and the second edge electrode EC2 and extends along the second direction DR2. The edge electrode ECc1 may be spaced apart from the first connection electrode CE1 with the first electrode E1 therebetween. In one embodiment of the present invention, when the edge electrode ECc1 is omitted, the first length LT1 may correspond to a distance between the end of the first electrode E1 and the boundary between the first electrode E1 and the first connection electrode CE1.

The second length LT2 may correspond to a distance between a boundary of the second electrode E2 and an edge electrode ECc2 and an end of the second electrode E2 facing the second connection electrode CE2. The edge electrode ECc2 may be an electrode that connects the third edge electrode EC3 and the fourth edge electrode EC4 and extends along the second direction DR2. The edge electrode ECc2 may be spaced apart from the connection electrode CE2 with the second electrode E2 therebetween.

Figure 8:
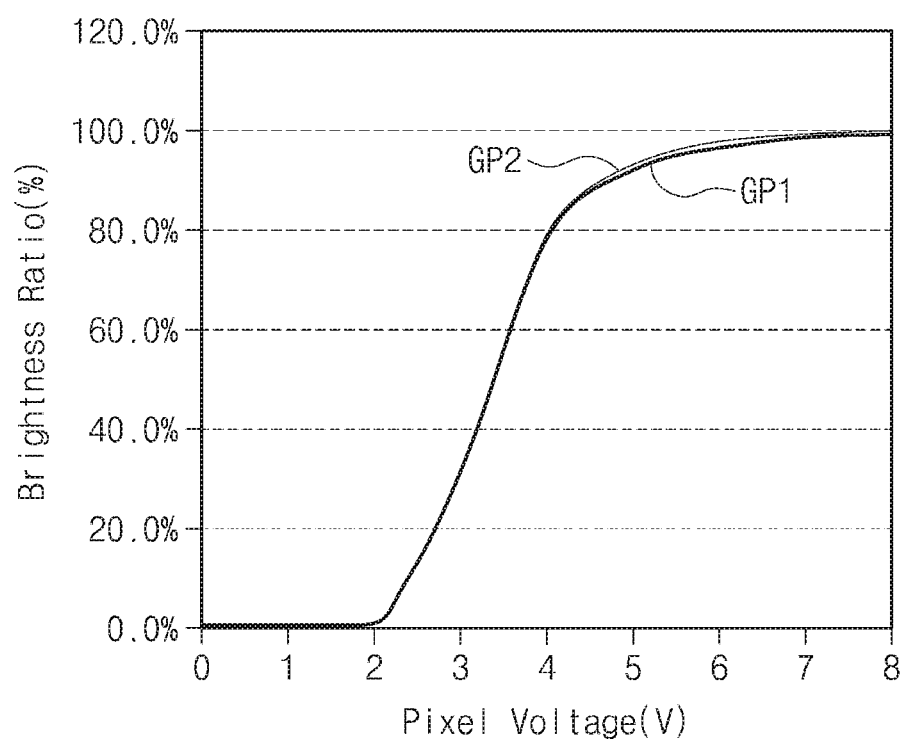
FIG. 8 is a graph showing a relationship between a brightness ratio and a pixel voltage, which was measured from first and second pixels according to an embodiment of the inventive concept.

FIG. 8 is a graph showing a relationship between a brightness ratio and a pixel voltage, which was measured from first and second pixels according to an embodiment of the inventive concept.

Referring to FIGS. 6 to 8, a first graph GP1 shows a curve of a brightness ratio obtained when a pixel voltage applied to a first pixel including the first pixel electrode PE1 was changed, and a second graph GP2 shows a curve of brightness ratio obtained when a pixel voltage applied to a second pixel including the second pixel electrode PE2 was changed.

If the brightness of the second pixel measured at the pixel voltage of 8V is defined as 100%, the brightness of the first pixel measured at the pixel voltage of 8V was 99.5%. In other words, a difference in highest brightness between the first and second pixels was 0.5% and was too small to be recognized by a user. Thus, the display quality of the display device DD (e.g., see FIG. 1) may be improved.

Figure 9:
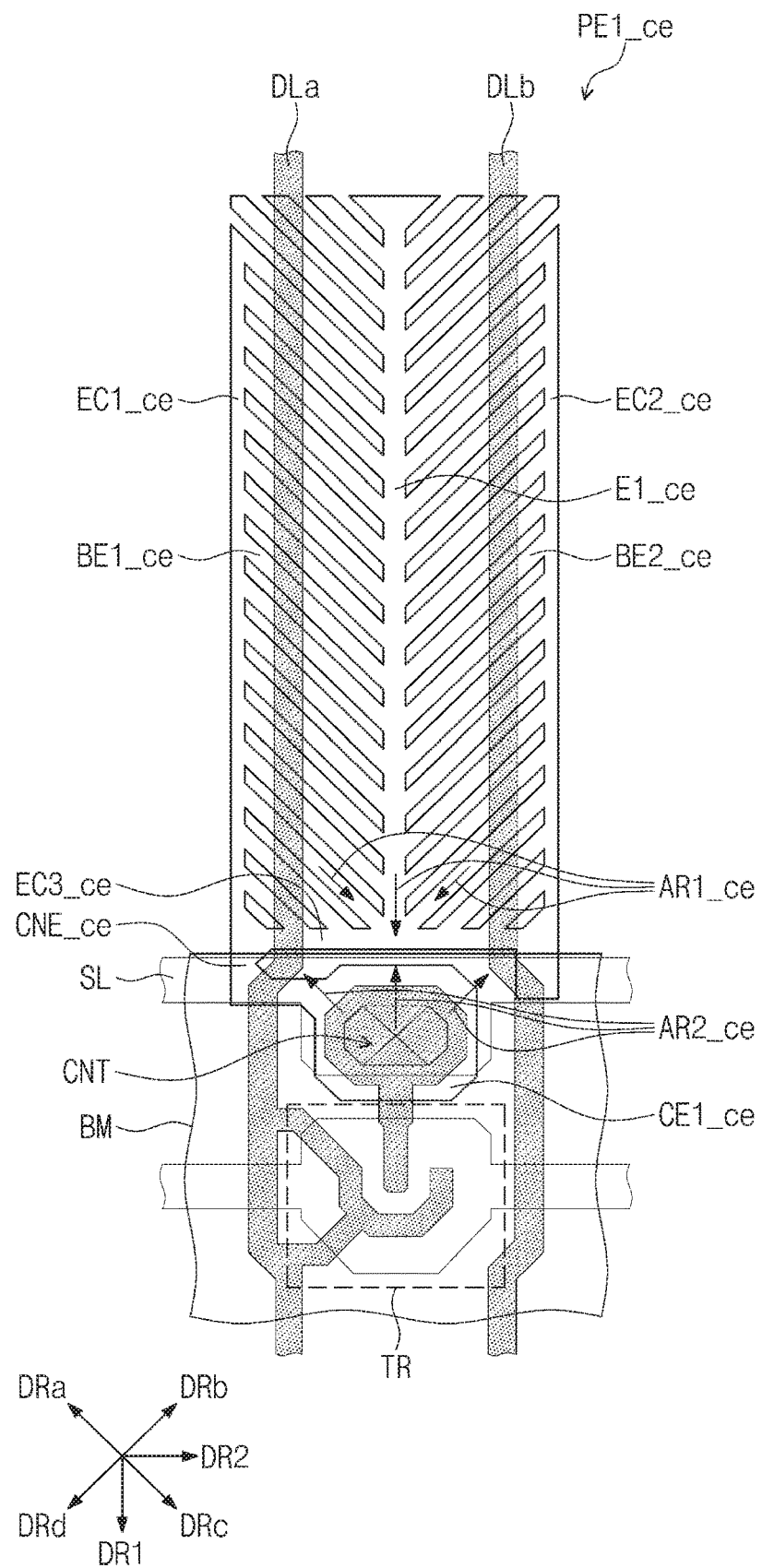
FIG. 9 is a plan view illustrating a first pixel electrode according to a comparative example of the inventive concept.

FIG. 9 is a plan view illustrating a first pixel electrode according to a comparative example of the inventive concept.

Referring to FIG. 9, a first pixel electrode PE1_ce may include a first electrode E1_ce, a first connection electrode CE1_ce, first branch electrodes BE1_ce, second branch electrodes BE2_ce, a connection branch electrode CNE_ce, a first edge electrode EC1_ce, a second edge electrode EC2_ce, and a third edge electrode EC3_ce. The first electrode E1_ce, the first connection electrode CE1_ce, the first branch electrodes BE1_ce, the second branch electrodes BE2_ce, the connection branch electrode CNE_ce, the first edge electrode EC1_ce, the second edge electrode EC2_ce, and the third edge electrode EC3_ce may be connected to constitute a single object.

Each of the first electrode E1_ce, the first edge electrode EC1_ce, and the second edge electrode EC2_ce may be extended in the first direction DR1. The third edge electrode EC3_ce may be connected to all of the first electrode E1_ce, the first edge electrode EC1_ce, and the second edge electrode EC2_ce and may be extended in the second direction DR2. When viewed in a plan view, the third edge electrode EC3_ce may be disposed between the first electrode E1_ce, the first edge electrode EC1_ce, and the second edge electrode EC2_ce and the first connection electrode CE1_ce.

The first branch electrodes BE1_ce may be extended in the fourth direction DRa, in a left domain region of the first electrode E1_ce. The second branch electrodes BE2_ce may be extended in the fifth direction DRb, in a right domain region of the first electrode E1_ce.

The connection branch electrode CNE_ce may be extended from a region, in which the first edge electrode EC1_ce and the third edge electrode EC3_ce are connected to each other, and may be connected to the first connection electrode CE1_ce.

In FIG. 9, a first arrow AR1_ce may represent an inclination direction of liquid crystal molecules controlled by the first electrode E1_ce, the first branch electrodes BE1_ce, and the second branch electrodes BE2_ce, and a second arrow AR2_ce may represent an inclination direction of liquid crystal molecules placed on or near the slant surface SLP (e.g., see FIG. 3).

Directions of the first arrow AR1_ce and the second arrow AR2_ce may be opposite to each other. Thus, the liquid crystal molecules may collide each other in a region adjacent to the third edge electrode EC3_ce. In other words, according to the comparative example, the texture may occur in a region that is not overlapped with the light-blocking portion BM. In this case, a brightness stain, which may result from a variation in brightness between pixels, may be recognized by a user.

Figure 10:
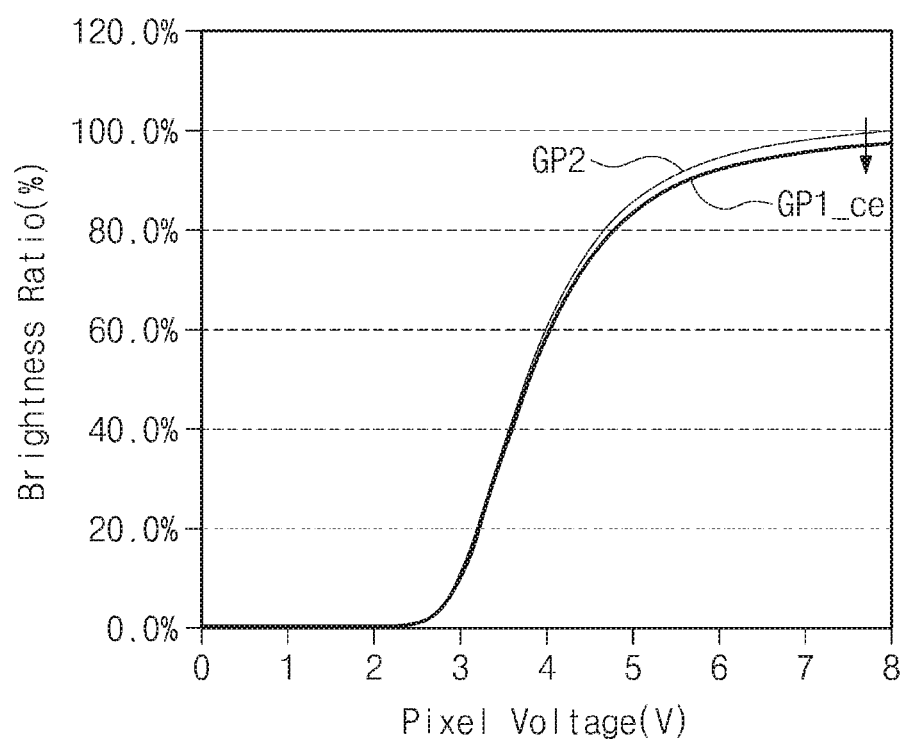
FIG. 10 is a graph showing a relationship between a brightness ratio and a pixel voltage, which was measured from first and second pixels according to a comparative example of the inventive concept.

FIG. 10 is a graph showing a relationship between a brightness ratio and a pixel voltage, which was measured from first and second pixels according to a comparative example of the inventive concept.

Referring to FIGS. 7, 9, and 10, a first graph GP1_ce shows a curve of a brightness ratio obtained when a pixel voltage applied to a first comparative pixel including the first pixel electrode PE1_ce was changed, and the second graph GP2 shows a curve of a brightness ratio obtained when a pixel voltage applied to a pixel voltage applied to a second pixel including the second pixel electrode PE2 was changed.

If the brightness of the second pixel measured at the pixel voltage of 8V is defined as 100%, the brightness of the first comparative pixel measured at the pixel voltage of 8V was 97.6%. In other words, a difference in highest brightness between the first comparative pixel and the second pixel was 2.4% and was large enough to be recognized by a user. In this case, a display quality of a display device may be deteriorated by a texture in a region near the third edge electrode EC3_ce.

However, according to an embodiment of the inventive concept, as described in FIG. 6, the length in the first direction DR1 of the first electrode E1 may be increased, and the first electrode E1 may be connected to the first connection electrode CE1. As a result, the orientation of the liquid crystal molecules may be controlled in the region overlapped with the light-blocking portion BM. According to an embodiment of the inventive concept, even if the texture occurs, it may occur in the region overlapped with the light-blocking portion BM, and thus, it may be possible to prevent a brightness property of each pixel from being affected by the texture. Accordingly, the display quality of the display device DD (e.g., see FIG. 1) may be improved.

Figure 11:
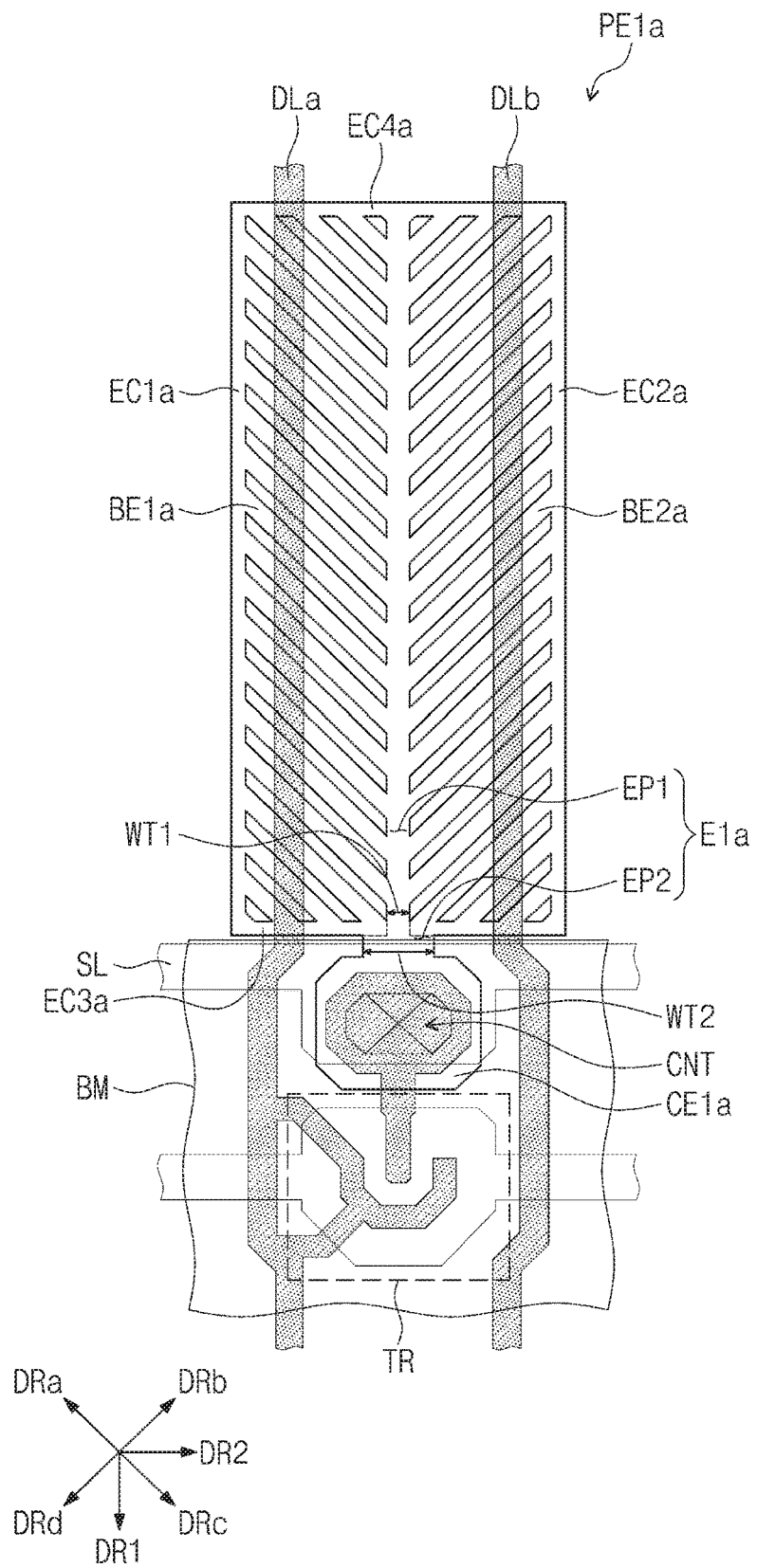
FIG. 11 is a plan view illustrating a first pixel electrode according to an embodiment of the inventive concept.

FIG. 11 is a plan view illustrating a first pixel electrode PE1a according to an embodiment of the inventive concept.

Referring to FIG. 11, a first pixel electrode PE1a may include a first electrode E1a, a first connection electrode CE1a, first branch electrodes BE1a, second branch electrodes BE2a, a first edge electrode EC1a, a second edge electrode EC2a, a third edge electrode EC3a, and a fourth edge electrode EC4a. The first electrode E1a, the first connection electrode CE1a, the first branch electrodes BE1a, the second branch electrodes BE2a, the first edge electrode EC1a, the second edge electrode EC2a, the third edge electrode EC3a, and the fourth edge electrode EC4a may be connected to constitute a single object.

Each of the first electrode E1a, the first edge electrode EC1a, and the second edge electrode EC2a may be extended in the first direction DR1.

The first electrode E1a may be connected to the first connection electrode CE1a. The first connection electrode CE1a may be an electrode that is disposed in the contact hole CNT and is electrically connected to the transistor TR.

In an embodiment, the first electrode E1a, which is placed to pass through a center of the first pixel electrode PE1a in the second direction DR2, may be extended in the first direction DR1 and may be connected to the first connection electrode CE1a. Thus, the first electrode E1a may be used to more strongly align liquid crystal molecules in the first direction DR1. As a result, a region, in which liquid crystal molecules collide each other, may be moved to a region adjacent to or overlapped with the light-blocking portion BM. Thus, it may be possible to suppress a brightness reduction issue caused by the texture and to reduce a difference in brightness between a first pixel including the first pixel electrode PE1a and a second pixel including the second pixel electrode PE2 (e.g., see FIG. 7). Accordingly, the display quality of the display device DD (e.g., see FIG. 1) may be improved.

The first electrode E1a may include a first electrode portion EP1 and a second electrode portion EP2. The second electrode portion EP2 may be overlapped with the light-blocking portion BM. Due to the presence of the second electrode portion EP2, the liquid crystal molecules near the light-blocking portion BM may be more strongly aligned to the first direction DR1. In an embodiment, a first width WT1 in the second direction DR2 of the first electrode portion EP1 may be different from a second width WT2 in the second direction DR2 of the second electrode portion EP2. The second direction DR2 may be perpendicular to the first direction DR1. For example, when viewed in a plan view, the first width WT1 may be a width of the first electrode portion EP1 that is not overlapped with the third edge electrode EC3a. The second width WT2 may be the largest width of the second electrode portion EP2. The second width WT2 may be larger than the first width WT1. Since the second width WT2 is larger than the first width WT1, a pixel voltage received from the first connection electrode CE1a may be more easily transferred to the first electrode portion EP1, the first branch electrodes BE1a, the second branch electrodes BE2a, the first edge electrode EC1a, the second edge electrode EC2a, the third edge electrode EC3a, and the fourth edge electrode EC4a. In an embodiment, the second width WT2 may be substantially equal to the first width WT1.

The first electrode E1a may be placed to pass through a center of the first pixel electrode PE1a, the first edge electrode EC1a may be placed at a left side of the first electrode E1a, and the second edge electrode EC2a may be placed at a right side of the first electrode E1a.

The third edge electrode EC3a and the fourth edge electrode EC4a may be extended in the second direction DR2. The first electrode E1a may be disposed between the third edge electrode EC3a and the fourth edge electrode EC4a. When viewed in a plan view, the third edge electrode EC3a may be placed in a region adjacent to the first connection electrode CE1a. The third edge electrode EC3a may cross the first electrode E1a.

The first branch electrodes BE1a may be extended in the fourth direction DRa, in a left domain region of the first electrode E1a. The second branch electrodes BE2a may be extended in the fifth direction DRb, in a right domain region of the first electrode E1a.

Figure 12:
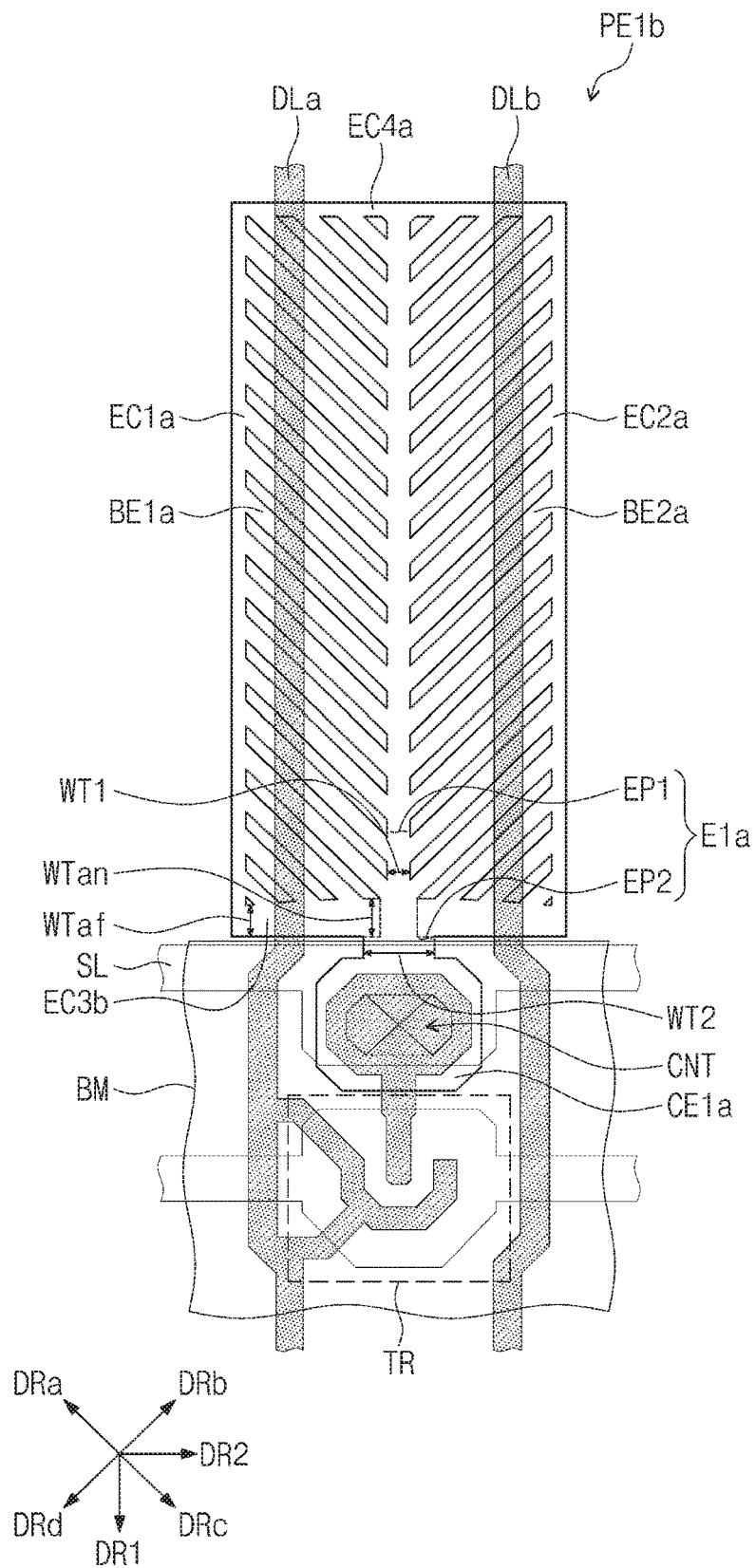
FIG. 12 is a plan view illustrating a first pixel electrode according to an embodiment of the inventive concept.

FIG. 12 is a plan view illustrating a first pixel electrode PE1b according to an embodiment of the inventive concept. In the following description of FIG. 12, an element previously described with reference to FIG. 11 will be identified by the same reference number without repeating an overlapping description thereof.

Referring to FIG. 12, a first pixel electrode PE1b may differ from the first pixel electrode PE1a of FIG. 11, in terms of a shape of a third edge electrode EC3b.

In the example of FIG. 11, a width in the first direction DR1 of the third edge electrode EC3a may be constant. However, a width in the first direction DR1 of the third edge electrode EC3b of FIG. 12 may vary from position to position.

For example, the width in the first direction DR1 of the third edge electrode EC3b may decrease in a direction away from the first electrode E1a. As shown in FIG. 12, the third edge electrode EC3b may have at least two different position-dependent widths (e.g., a first width WTan and a second width WTaf). Both of the first width WTan and the second width WTaf of the third edge electrode EC3b may be widths measured in the first direction DR1. A portion of the third edge electrode EC3b having the first width WTan may be closer to the first electrode E1a than another portion having the second width WTaf. Thus, the first width WTan may be larger than the second width WTaf.

In FIG. 12, the width in the first direction DR1 of the third edge electrode EC3b is illustrated to decrease in a direction away from the first electrode E1a, but the inventive concept is not limited thereto. For example, the width in the first direction DR1 of the third edge electrode EC3b may increase in the direction away from the first electrode E1a or the third edge electrode EC3b may be omitted, if in such a configuration, the texture can be moved toward or overlapped with the light-blocking portion BM.

Figure 13:
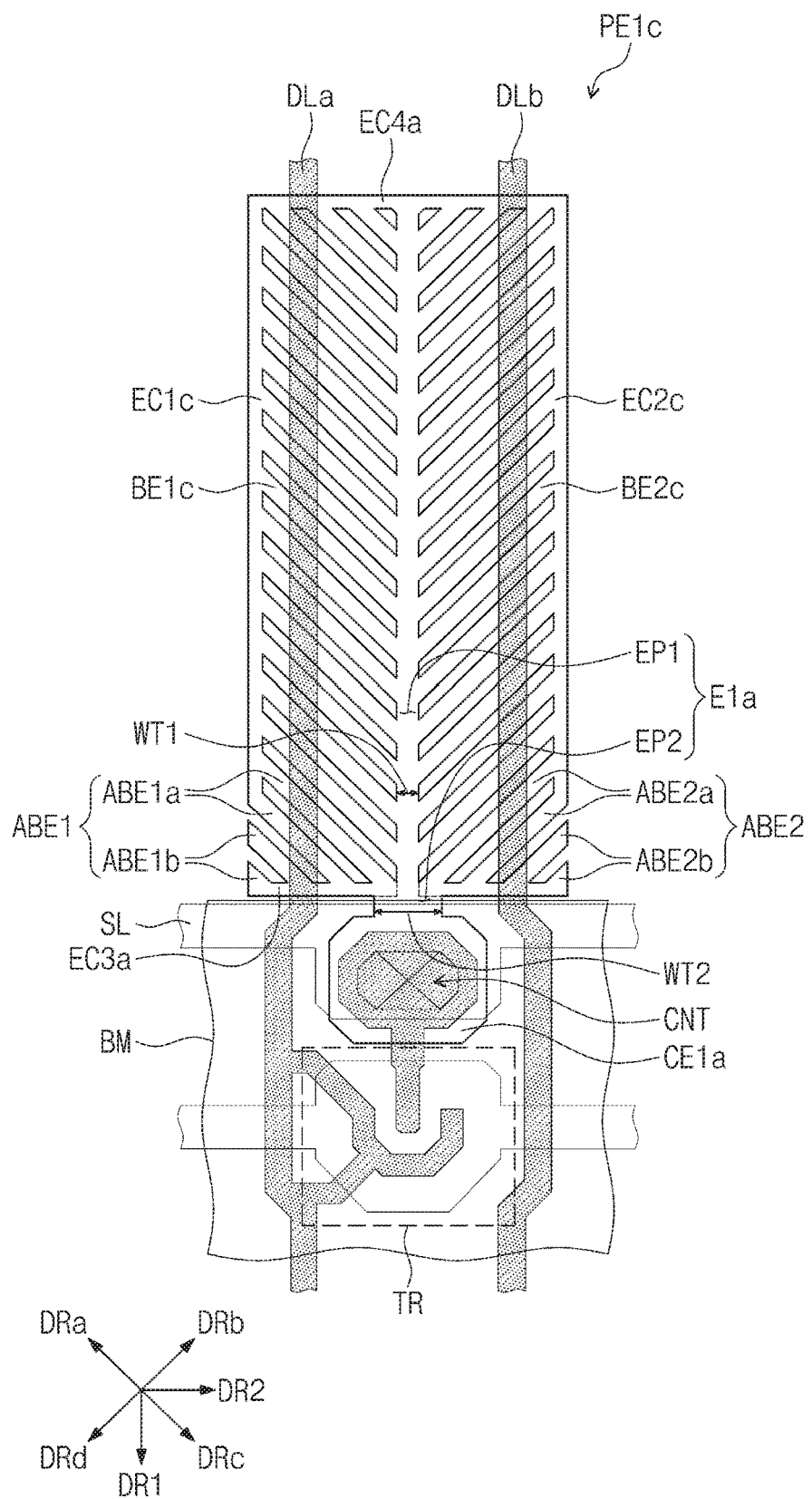
FIG. 13 is a plan view illustrating a first pixel electrode according to an embodiment of the inventive concept.

FIG. 13 is a plan view illustrating a first pixel electrode PE1c according to an embodiment of the inventive concept. In the following description of FIG. 13, an element previously described with reference to FIG. 11 will be identified by the same reference number without repeating an overlapping description thereof.

Referring to FIG. 13, a first pixel electrode PE1c may include the first electrode E1a, the first connection electrode CE1a, first branch electrodes BE1c, second branch electrodes BE2c, a first edge electrode EC1c, a second edge electrode EC2c, the third edge electrode EC3a, the fourth edge electrode EC4a, first additional branch electrodes ABE1, and second additional branch electrodes ABE2. The first electrode E1a, the first connection electrode CE1a, the first branch electrodes BE1a, the second branch electrodes BE2a, the first edge electrode EC1c, the second edge electrode EC2c, the third edge electrode EC3a, the fourth edge electrode EC4a, the first additional branch electrodes ABE1, and the second additional branch electrodes ABE2 may be connected to constitute a single object.

The first branch electrodes BE1c may be extended from the first electrode E1a in the fourth direction DRa, and the second branch electrodes BE2c may be extended from the first electrode E1a in the fifth direction DRb. Thus, one ends of the first branch electrodes BE1c and the second branch electrodes BE2c may be connected to the first electrode E1a. Opposite ends of some of the first branch electrodes BE1c may be connected to the first edge electrode EC1c, and opposite ends of others may be connected to the fourth edge electrode EC4a. Opposite ends of some of the second branch electrodes BE2c may be connected to the second edge electrode EC2c, and opposite ends of others may be connected to the fourth edge electrode EC4a.

The first additional branch electrodes ABE1 and the second additional branch electrodes ABE2 may be extended from the third edge electrode EC3a. The first additional branch electrodes ABE1 may be extended from the third edge electrode EC3a in the fourth direction DRa, and the second additional branch electrodes ABE2 may be extended from the third edge electrode EC3a in the fifth direction DRb.

One ends of the first additional branch electrodes ABE1 and the second additional branch electrodes ABE2 may be connected to the third edge electrode EC3a. Opposite ends of some (e.g., first additional branch electrodes ABE1a) of the first additional branch electrodes ABE1 may be connected to the first edge electrode EC1c, and opposite ends of the remaining ones (e.g., first additional branch electrodes ABE1b) may not be connected to the first edge electrode EC1c. Opposite ends of some (e.g., second additional branch electrodes ABE2a) of the second additional branch electrodes ABE2 may be connected to the second edge electrode EC2c, and opposite ends of the remaining ones (e.g., second additional branch electrodes ABE2b) may not be connected to the second edge electrode EC2c. The first additional branch electrodes ABE1 and the second additional branch electrodes ABE2 may not be directly connected to the first electrode E1a.

When compared with FIG. 11, lengths in the first direction DR1 of the first and second edge electrodes EC1c and EC2c may be shorter than lengths in the first direction DR1 of the first and second edge electrodes EC1a and EC2a of FIG. 11. Thus, the opposite ends of the first additional branch electrodes ABE1b and the opposite ends of the second additional branch electrodes ABE2b may not be connected to the first and second edge electrodes EC1c and EC2c.

Figure 14:
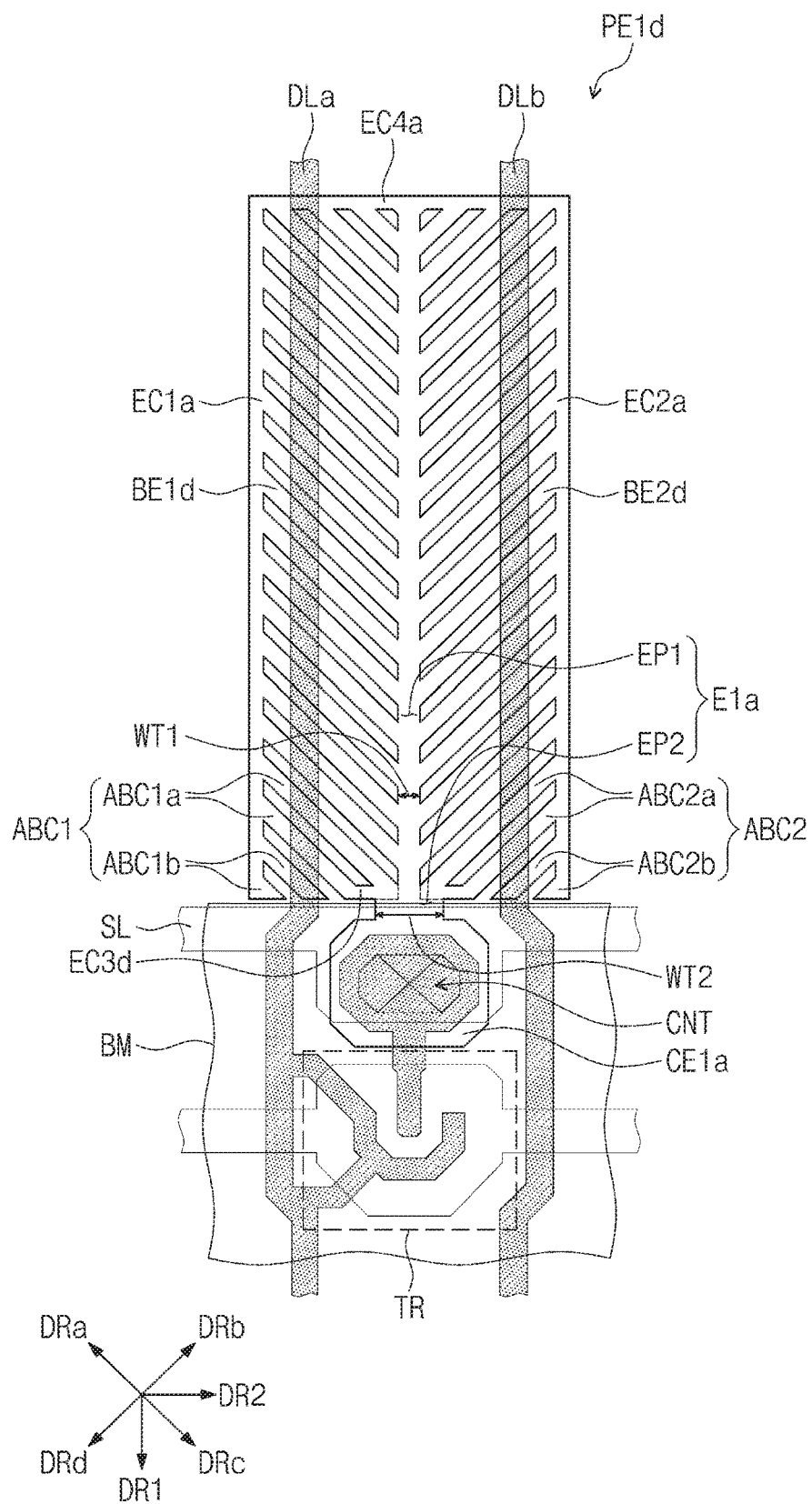
FIG. 14 is a plan view illustrating a first pixel electrode according to an embodiment of the inventive concept.

FIG. 14 is a plan view illustrating a first pixel electrode PE1d according to an embodiment of the inventive concept. In the following description of FIG. 14, an element previously described with reference to FIG. 11 will be identified by the same reference number without repeating an overlapping description thereof.

Referring to FIG. 14, a first pixel electrode PE1d may include the first electrode E1a, the first connection electrode CE1a, first branch electrodes BE1d, second branch electrodes BE2d, the first edge electrode EC1a, the second edge electrode EC2a, third edge electrode EC3d, the fourth edge electrode EC4a, first additional branch electrodes ABC1, and second additional branch electrodes ABC2. The first electrode E1a, the first connection electrode CE1a, the first branch electrodes BE1d, the second branch electrodes BE2d, the first edge electrode EC1a, the second edge electrode EC2a, the third edge electrode EC3d, the fourth edge electrode EC4a, the first additional branch electrodes ABC1, and the second additional branch electrodes ABC2 may be connected to constitute a single object.

The first branch electrodes BE1d may be extended from the first electrode E1a in the fourth direction DRa, and the second branch electrodes BE2d may be extended from the first electrode E1a in the fifth direction DRb. The first and second branch electrodes BE1d and BE2d of FIG. 14 may have substantially the same structure as the first and second branch electrodes BE1c and BE2c described with reference to FIG. 13. Thus, a detailed description thereof will be omitted.

The first additional branch electrodes ABC1 may be extended from the first edge electrode EC1a, and the second additional branch electrodes ABC2 may be extended from the second edge electrode EC2a. The first additional branch electrodes ABC1 may be extended from the first edge electrode EC1a in a direction parallel to the first branch electrodes BE1d, and the second additional branch electrodes ABC2 may be extended from the second edge electrode EC2a in a direction parallel to the second branch electrodes BE2d.

One ends of the first additional branch electrodes ABC1 may be connected to the first edge electrode EC1a, and one ends of the second additional branch electrodes ABC2 may be connected to the second edge electrode EC2a. Opposite ends of some (e.g., first additional branch electrodes ABC1a) of the first additional branch electrodes ABC1 may be connected to the third edge electrode EC3d, and opposite ends of the remaining ones (e.g., first additional branch electrodes ABC1b) may not be connected to the third edge electrode EC3d. Opposite ends of some (e.g., second additional branch electrodes ABC2a) of the second additional branch electrodes ABC2 may be connected to the third edge electrode EC3d, and opposite ends of the remaining ones (e.g., second additional branch electrodes ABC2b) may not be connected to the third edge electrode EC3d.

A length in the second direction DR2 of the third edge electrode EC3d may be shorter than a length in the second direction DR2 of the third edge electrode EC3a of FIG. 11. Thus, the opposite ends of the first additional branch electrodes ABC1b and the opposite ends of the second additional branch electrodes ABC2b may not be connected to the third edge electrode EC3d.

Figure 15:
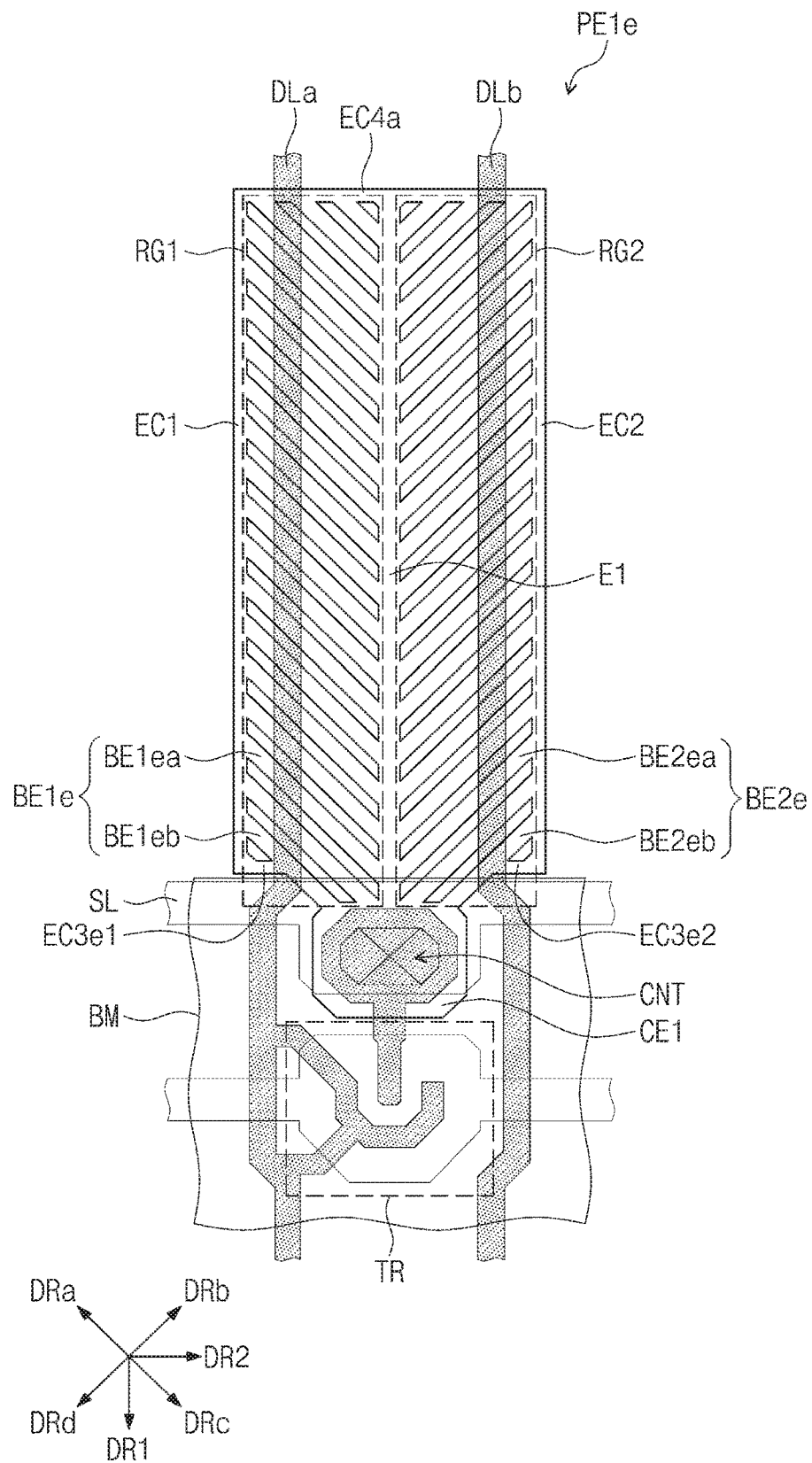
FIG. 15 is a plan view illustrating a first pixel electrode according to an embodiment of the inventive concept.

FIG. 15 is a plan view illustrating a first pixel electrode PE1e according to an embodiment of the inventive concept. In the following description of FIG. 15, an element previously described with reference to FIG. 6 will be identified by the same reference number without repeating an overlapping description thereof.

Referring to FIG. 15, a first pixel electrode PE1e may include the first electrode E1, the first connection electrode CE1, first branch electrodes BE1e, second branch electrodes BE2e, the first edge electrode EC1, the second edge electrode EC2, third edge electrodes EC3e1 and EC3e2, and the fourth edge electrode EC4a. The first electrode E1, the first connection electrode CE1, the first branch electrodes BE1e, the second branch electrodes BE2e, the first edge electrode EC1, the second edge electrode EC2, the third edge electrodes EC3e1 and EC3e2, and the fourth edge electrode EC4a may be connected to constitute a single object.

The first pixel electrode PE1e may be divided into a first region RG1 and a second region RG2, based on a position of the first electrode E1. The first region RG1 may be a region that is located at a left side of the first electrode E1, and the second region RG2 may be a region that is located at a right side of the first electrode E1.

The first branch electrodes BE1e may be disposed in the first region RG1, and the second branch electrodes BE2e may be disposed in the second region RG2. The first branch electrodes BE1e may be extended in the fourth direction DRa, and the second branch electrodes BE2e may be extended in the fifth direction DRb.

Some (e.g., first branch electrodes BE1ea) of the first branch electrodes BE1e may be connected to the first electrode E1, and the remaining ones (e.g., first branch electrodes BE1eb) of the first branch electrodes BE1e may be connected to the first connection electrode CE1. Some (e.g., second branch electrodes BE2ea) of the second branch electrodes BE2e may be connected to the first electrode E1, and the remaining ones (e.g., second branch electrodes BE2eb) of the second branch electrodes BE2e may be connected to the first connection electrode CE1. The first branch electrodes BE1eb and the second branch electrodes BE2eb may be referred to as first and second connection branch electrodes, respectively.

A portion of each of the first branch electrodes BE1eb, a portion of each of the second branch electrodes BE2eb, and a portion of the first electrode E1 may be overlapped with the light-blocking portion BM, when viewed in a plan view. Thus, orientations of liquid crystal molecules disposed in the region overlapped with the light-blocking portion BM may be controlled by the portion of each of the first branch electrodes BE1eb, the portion of each of the second branch electrodes BE2eb, and the portion of the first electrode E1. Accordingly, even though the liquid crystal molecules are distorted by a resistive force from liquid crystal molecules near the slant surface SLP (e.g., see FIG. 3), the distortion of liquid crystal molecules may occur in the region overlapped with the light-blocking portion BM. In other words, even if a texture occurs, the texture may occur in the region overlapped with the light-blocking portion BM and may not be recognized by a user.

The third edge electrode EC3e1 and the third edge electrode EC3e2 may be extended in the second direction DR2. The third edge electrode EC3e1 may be connected to at least one of the first edge electrode EC1 and the first branch electrodes BE1eb, and the third edge electrode EC3e2 may be connected to at least one of the second edge electrode EC2 and the second branch electrodes BE2eb.

Figure 16:
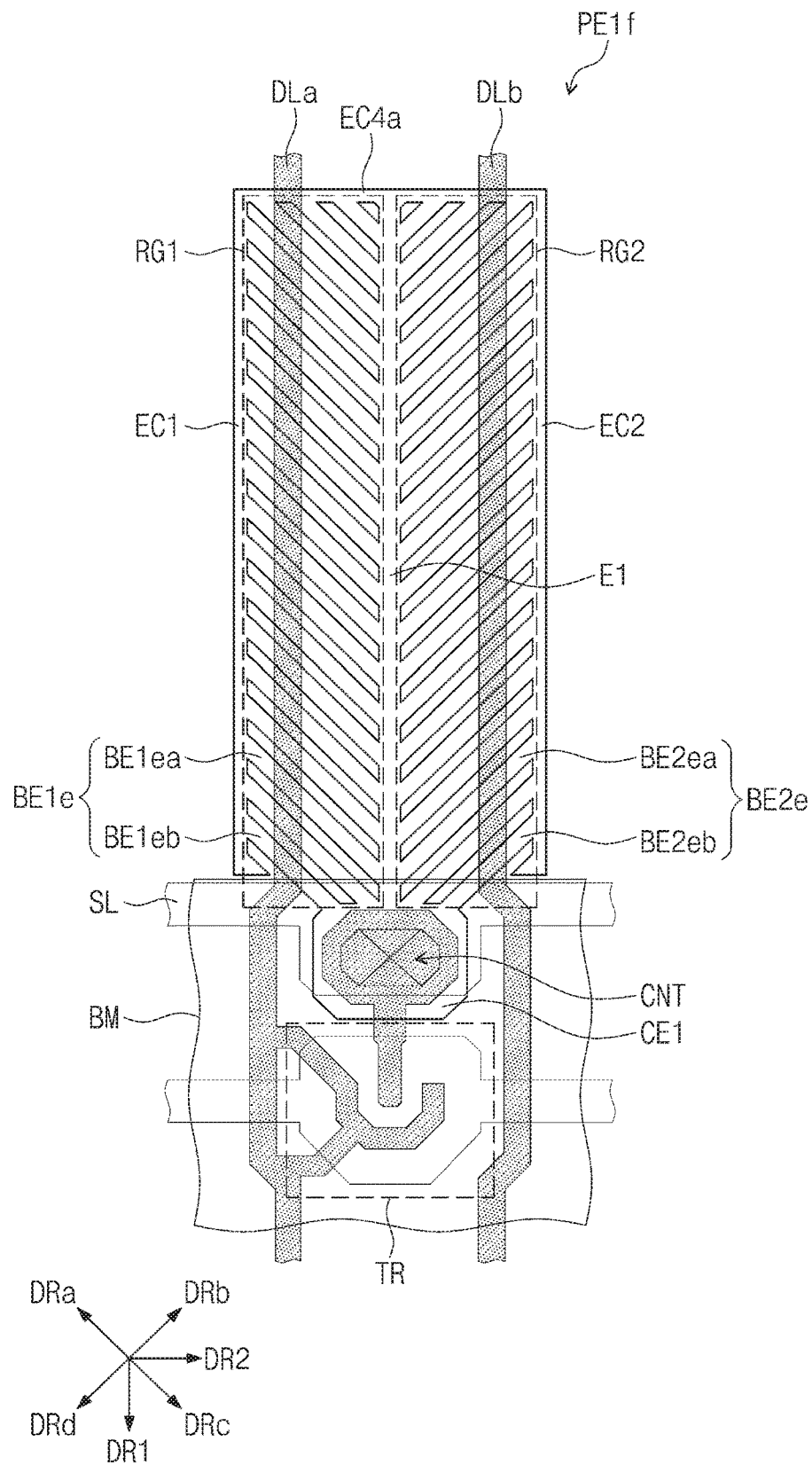
FIG. 16 is a plan view illustrating a first pixel electrode according to an embodiment of the inventive concept.

FIG. 16 is a plan view illustrating a first pixel electrode PE1f according to an embodiment of the inventive concept.

When compared with the first pixel electrode PE1e of FIG. 15, the third edge electrodes EC3e1 and EC3e2 (e.g., see FIG. 15) may be omitted from the first pixel electrode PE1f of FIG. 16.

Figure 17:
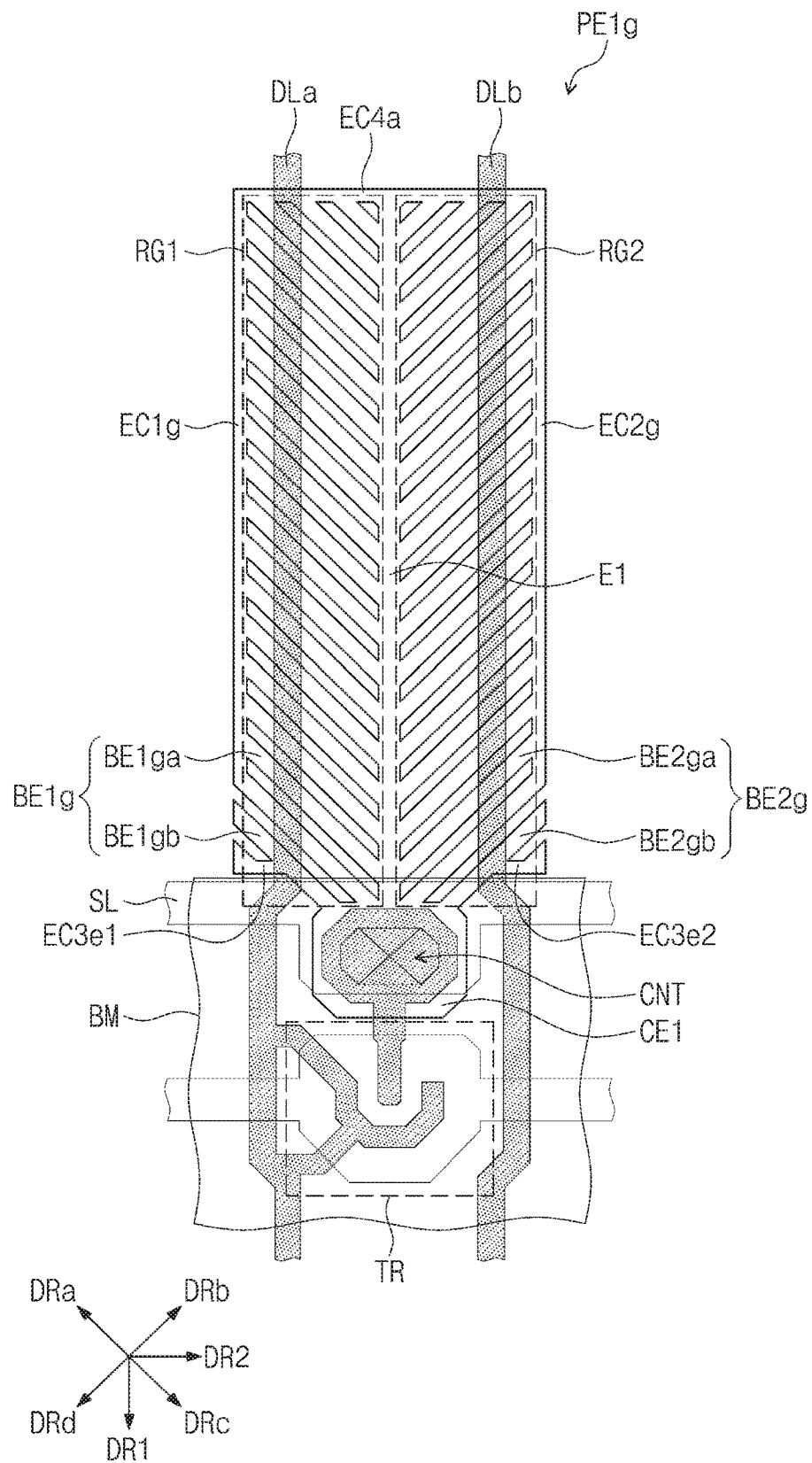
FIG. 17 is a plan view illustrating a first pixel electrode according to an embodiment of the inventive concept.

FIG. 17 is a plan view illustrating a first pixel electrode PE1g according to an embodiment of the inventive concept.

Referring to FIG. 17, the first pixel electrode PE1g may include first branch electrodes BE1g disposed in the first region RG1 and second branch electrodes BE2g disposed in the second region RG2. The first branch electrodes BE1g may extend in the fourth direction DRa, and the second branch electrodes BE2g may extend in the fifth direction DRb.

Some (e.g., first branch electrodes BE1ga) of the first branch electrodes BE1g may be connected to the first electrode E1, and the remaining ones (e.g., first branch electrodes BE1gb) of the first branch electrodes BE1g may be connected to the first connection electrode CE1. Some (e.g., second branch electrodes BE2ga) of the second branch electrodes BE2g may be connected to the first electrode E1, and the remaining ones (e.g., second branch electrodes BE2gb) of the second branch electrodes BE2g may be connected to the first connection electrode CE1.

The first branch electrodes BE1gb may not be connected to a first edge electrode EC1g, and the second branch electrodes BE2gb may not be connected to a second edge electrode EC2g. A length, in the first direction DR1, of each of the first and second edge electrodes EC1g and EC2g of the first pixel electrode PE1g of FIG. 17 may be shorter than a length, in the first direction DR1, of each of the first and second edge electrode EC1 and EC2 of the first pixel electrode PE1e of FIG. 15. Thus, the first branch electrodes BE1gb and the second branch electrodes BE2gb may not be connected to the first and second edge electrodes EC1g and EC2g.

Figure 18:
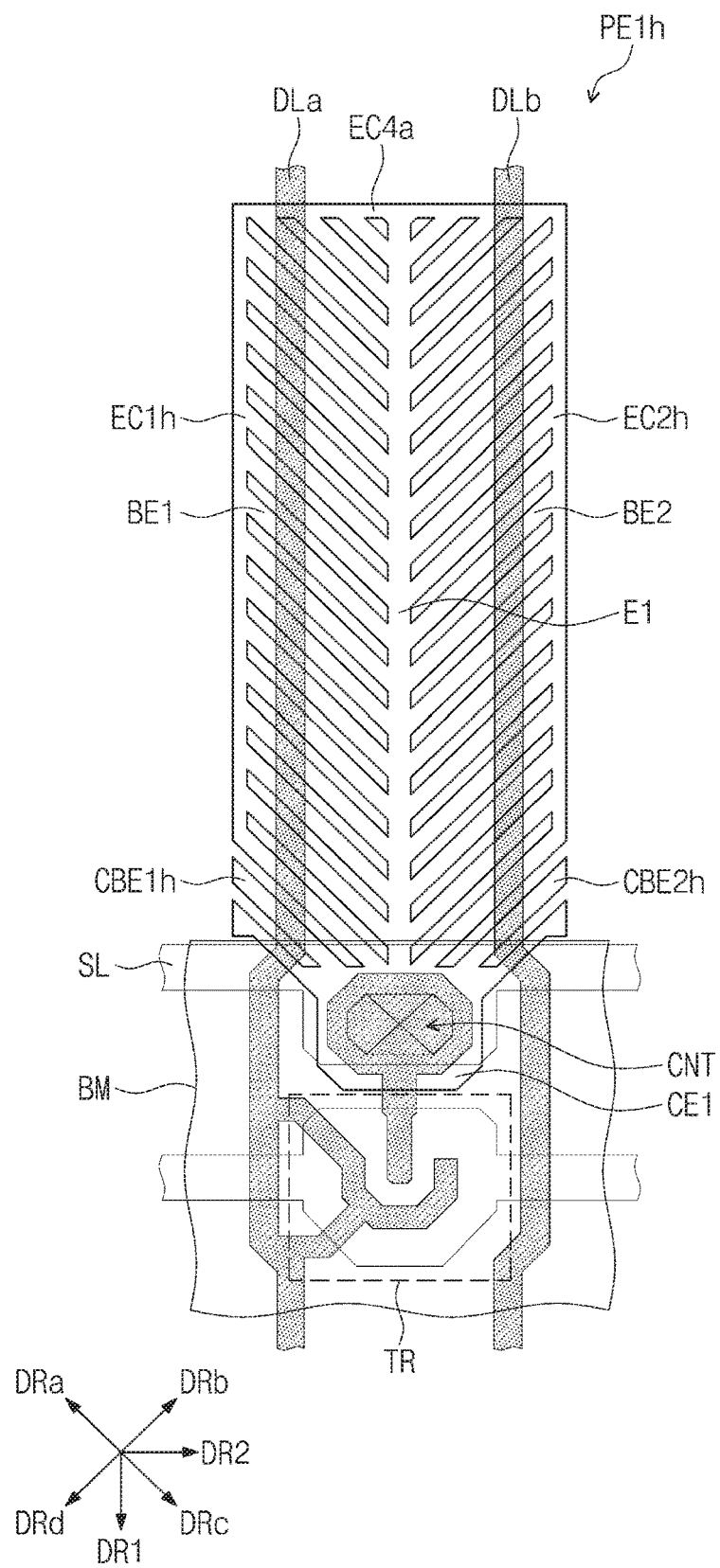
FIG. 18 is a plan view illustrating a first pixel electrode according to an embodiment of the inventive concept.

FIG. 18 is a plan view illustrating a first pixel electrode PE1h according to an embodiment of the inventive concept. In the following description of FIG. 18, an element previously described with reference to FIG. 6 will be identified by the same reference number without repeating an overlapping description thereof.

Referring to FIG. 18, lengths of first and second edge electrodes EC1h and EC2h of the first pixel electrode PE1h may be different from lengths of the first and second edge electrodes EC1 and EC2 of the first pixel electrode PE1 of FIG. 6, when measured in the first direction DR1.

Each of a first connection branch electrode CBE1h and a second connection branch electrode CBE2h may be extended from the first connection electrode CE1.

The first connection branch electrode CBE1h may be extended from the first connection electrode CE1 in the fourth direction DRa, and the second connection branch electrode CBE2h may be extended from the first connection electrode CE1 in the fifth direction DRb. In other words, the first connection branch electrode CBE1 may be extended in a direction parallel to the first branch electrodes BE1, and the second connection branch electrode CBE2 may be extended in a direction parallel to the second branch electrodes BE2. One end of the first connection branch electrode CBE1h may be connected to the first connection electrode CE1, and an opposite end of the first connection branch electrode CBE1h may not be connected to the first edge electrode EC1h. One end of the second connection branch electrode CBE2h may be connected to the first connection electrode CE1, and an opposite end of the second connection branch electrode CBE2h may not be connected to the second edge electrode EC2h.

In an embodiment, a shape of the first pixel electrode PE1h may be variously changed to move a position of a texture to a region adjacent to or overlapped with the light-blocking portion BM. For example, slits between a plurality of first connection branch electrodes CBE1h and between a plurality of second connection branch electrode CBE2h are opened, as shown in FIG. 18, but the inventive concept is not limited thereto.

According to an embodiment of the inventive concept, a pixel electrode, which is disposed in a light-emitting region and is used to control orientations of liquid crystal molecules, may include at least a portion that is extended toward a light-blocking portion. When viewed in a plan view, the at least portion of the pixel electrode may be overlapped with the light-blocking portion and may be used to control orientations of liquid crystal molecules under the light-blocking portion. Thus, even though the liquid crystal molecules near a region, in which the pixel electrode and a pixel circuit are connected to each other, collide each other, the distortion of the liquid crystal molecules may be confined within a region overlapped with the light-blocking portion. In other words, even though the distortion of the liquid crystal molecules results in a texture phenomenon, the texture phenomenon may occur in the region overlapped with the light-blocking portion, and thus, the texture may not be recognized by a user. As a result, a display quality of a display device may be improved.

While example embodiments of the inventive concept have been particularly shown and described, it will be understood by one of ordinary skill in the art that variations in form and detail may be made therein without departing from the spirit and scope of the attached claims.

What is claimed is:

1. A display device, comprising:
a display panel comprising a first pixel including a first pixel electrode and a first pixel circuit and a second pixel disposed adjacent to the first pixel and including a second pixel electrode and a second pixel circuit,
wherein the first pixel electrode comprises:
a first electrode including a first side and a second side extending in a first direction;
a first connection electrode directly connected to the first electrode and electrically connected to the first pixel circuit, a width of the first connection electrode being wider than that of the first electrode;
first branch electrodes extended from the first side in a second direction away from the first connection electrode; and
second branch electrodes extended from the second side in a third direction away from the first connection electrode.

2. The display device of claim 1, wherein the second pixel electrode comprises:
a second electrode including a third side and a fourth side extending in the first direction;
third branch electrodes extended from the third side in an opposite direction of the third direction;
fourth branch electrodes extended from the fourth side in an opposite direction of the second direction; and
a second connection electrode connected to at least one of the third branch electrodes or at least one of the fourth branch electrodes and electrically connected to the second pixel circuit.

3. The display device of claim 2, wherein a first length in the first direction of the first electrode is larger than a second length in the first direction of the second electrode.

4. The display device of claim 1, wherein the first pixel electrode further comprises:
at least one first connection branch electrode extended from the first connection electrode in the second direction and connected to the first connection electrode; and
at least one second connection branch electrode extended from the first connection electrode in the third direction and connected to the first connection electrode.

5. The display device of claim 4, wherein the display panel further comprises a light-blocking portion, and
when viewed in a plan view, the light-blocking portion is overlapped with the first pixel circuit, the second pixel circuit, the second connection electrode, at least a portion of the first electrode, at least a portion of the first connection branch electrode, and at least a portion of the second connection branch electrode.

6. The display device of claim 4, wherein the first pixel electrode further comprises:
a first edge electrode extended in the first direction and connected to the first branch electrodes; and
a second edge electrode extended in the first direction and connected to the second branch electrodes.

7. The display device of claim 6, wherein the first edge electrode is connected to the first connection branch electrode, and
the second edge electrode is connected to the second connection branch electrode.

8. The display device of claim 1, wherein the display panel further comprises a light-blocking portion, and
when viewed in a plan view, the light-blocking portion is overlapped with the first pixel circuit, the second pixel circuit, the first connection electrode, and at least a portion of the first electrode.

9. The display device of claim 8, wherein the first electrode comprises a first electrode portion overlapped with the light-blocking portion and a second electrode portion non-overlapped with the light-blocking portion, and
a first width of the first electrode portion is larger than a second width of the second electrode portion, when measured in a direction perpendicular to the first direction.

10. The display device of claim 1, wherein the first pixel electrode further comprises:
a first edge electrode extended in the first direction and connected to the first branch electrodes;
a second edge electrode extended in the first direction and connected to the second branch electrodes; and
a third edge electrode extended in a direction perpendicular to the first direction and placed in a region adjacent to the first connection electrode.

11. The display device of claim 10, wherein a width in the first direction of the third edge electrode decreases with increasing distance from the first electrode.

12. The display device of claim 10, wherein the first pixel electrode further comprises:
first additional branch electrodes extended from the third edge electrode in the second direction, the first additional branch electrodes not directly contacting the first electrode; and
second additional branch electrodes extended from the third edge electrode in the third direction, the second additional branch electrodes not directly contacting the first electrode.

13. The display device of claim 12, wherein at least some of the first additional branch electrodes are connected to the first edge electrode,
others of the first additional branch electrodes are not connected to the first edge electrode,
at least some of the second additional branch electrodes are connected to the second edge electrode, and
others of the second additional branch electrodes are not connected to the second edge electrode.

14. The display device of claim 1, wherein the first pixel electrode further comprises:
a first edge electrode extended in the first direction and connected to the first branch electrodes;
a second edge electrode extended in the first direction and connected to the second branch electrodes;
first additional branch electrodes extended from the first edge electrode in a direction parallel to the first branch electrodes; and
second additional branch electrodes extended from the second edge electrode in a direction parallel to the second branch electrodes.

15. A display device, comprising:
a first base substrate;
a pixel circuit disposed on the first base substrate;
a pixel electrode including a connection electrode connected to the pixel circuit, a first electrode directly connected to the connection electrode and extended in a first direction, the first electrode having a width narrower than that of the connection electrode, and a plurality of branch electrodes extended in directions crossing the first direction, the pixel electrode including a first region and a second region based on a position of the first electrode;

a liquid crystal layer disposed on the pixel electrode;

a second base substrate disposed on the liquid crystal layer; and a light-blocking portion disposed on a surface of the second base substrate facing the first base substrate and overlapped with the pixel circuit and at least a portion of the first electrode, when viewed in a plan view.

16. The display device of claim 15, wherein some of the plurality of branch electrodes are disposed in the first region and are extended in a second direction, and others of the plurality of branch electrodes are disposed in the second region and are extended in a third direction different from the second direction.

17. The display device of claim 15, wherein at least some of the plurality of branch electrodes are connected to the connection electrode and are not connected to the first electrode, and a portion of each of the branch electrodes connected to the connection electrode is overlapped with the light-blocking portion, when viewed in a plan view.

18. A display device, comprising:

a first pixel including a first pixel electrode and a first pixel circuit; and a second pixel disposed adjacent to the first pixel and including a second pixel electrode and a second pixel circuit, wherein the first pixel electrode comprises a first electrode extending in a first direction, a first connection electrode connecting the first electrode to the first pixel circuit, the width of the first connection electrode being wider than that of the first electrode, and a plurality of first branch electrodes extending from sides of the first electrode, which are extended in the first direction, in directions away from the first pixel circuit, the second pixel electrode comprises a second electrode extending in the first direction, a plurality of second branch electrodes extending from sides of the second electrode, which are extended in the first direction, in directions toward the second pixel circuit, and a second connection electrode connecting at least some of the plurality of second branch electrodes to the second pixel circuit, and a length in the first direction of the first electrode is longer than a length in the first direction of the second electrode.

19. The display device of claim 18, wherein the first pixel and the second pixel are provided in plural, the first pixels and the second pixels are alternately arranged one by one in the first direction, and the first pixels and the second pixels are alternately arranged, at least, one by one in a direction perpendicular to the first direction.

20. The display device of claim 18, wherein the first connection electrode is connected to at least some of the plurality of first branch electrodes.

* * * * *